United States Patent
Yoshida et al.

(10) Patent No.: US 12,436,446 B2
(45) Date of Patent: *Oct. 7, 2025

(54) LENS UNIT

(71) Applicant: NIDEC SANKYO CORPORATION, Nagano (JP)

(72) Inventors: Toshiyuki Yoshida, Nagano (JP); Toshio Shirotori, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 767 days.

This patent is subject to a terminal disclaimer.

(21) Appl. No.: 17/211,784

(22) Filed: Mar. 24, 2021

(65) Prior Publication Data

US 2021/0302805 A1    Sep. 30, 2021

(30) Foreign Application Priority Data

Mar. 30, 2020 (JP) ................. 2020-060063

(51) Int. Cl.
G03B 17/12 (2021.01)
G02B 7/02 (2021.01)

(52) U.S. Cl.
CPC ............. G03B 17/12 (2013.01); G02B 7/021 (2013.01); G02B 7/025 (2013.01); G02B 7/026 (2013.01)

(58) Field of Classification Search
CPC .. G02B 13/003; G02B 13/0045; G02B 7/021; G02B 7/025; G02B 7/026; B60R 1/00; B60R 11/04; G03B 17/08; G03B 17/12; G03B 30/00; G03B 29/00

See application file for complete search history.

(56) References Cited

U.S. PATENT DOCUMENTS

| | | | |
|---|---|---|---|
| 10,527,814 B2 | 1/2020 | Komiyama et al. | |
| 2014/0218813 A1 | 8/2014 | Araki et al. | |
| 2018/0088297 A1* | 3/2018 | Komiyama | G02B 7/021 |
| 2019/0049693 A1* | 2/2019 | Wang | G02B 7/025 |
| 2020/0049932 A1* | 2/2020 | Wei | G02B 7/022 |
| 2020/0209506 A1* | 7/2020 | Liu | H04N 23/57 |
| 2021/0302805 A1 | 9/2021 | Yoshida et al. | |
| 2022/0171152 A1* | 6/2022 | Shirotori | G02B 13/18 |
| 2022/0390704 A1* | 12/2022 | Ohara | G02B 7/026 |

FOREIGN PATENT DOCUMENTS

| | | |
|---|---|---|
| CN | 103874950 | 6/2014 |
| CN | 206270582 | 6/2017 |
| CN | 207541315 | 6/2018 |
| CN | 209514180 | 10/2019 |
| CN | 214623151 | 11/2021 |
| JP | 2018054922 | 4/2018 |

OTHER PUBLICATIONS

"Office Action of China Counterpart Application", issued on Nov. 2, 2022, with English translation thereof, pp. 1-13.

* cited by examiner

*Primary Examiner* — Bumsuk Won
*Assistant Examiner* — Samanvitha Sridhar
(74) *Attorney, Agent, or Firm* — JCIPRNET

(57) ABSTRACT

An O-ring seals between a first lens and a lens barrel. Further, between the second lens and the lens barrel is also sealed by a first adhesive layer. The lens barrel, in a state before manufacturing of the lens unit, is provided with a communication passage that communicates an inside of the lens barrel with an outer peripheral groove (outside of the lens barrel). The communication passage, in the state of FIG. 1 after manufacturing, is sealed by a second adhesive layer (third seal member) made of an adhesive.

20 Claims, 15 Drawing Sheets

(c)

(d)

LENS UNIT

CROSS REFERENCE TO RELATED APPLICATION

The present application claims priority under 35 U.S.C. § 119 to Japanese Application No. 2020-060063, filed on Mar. 30, 2020, and the entire content of which is incorporated herein by reference.

BACKGROUND

Field of the Invention

At least an embodiment of the present invention relates to a lens unit including a plurality of lenses and a lens barrel for accommodating and fixing the lenses.

Description of the Related Documents

For example, as an optical system used in an imaging device mounted on an automobile, a surveillance camera, etc., there is used a lens unit in which a plurality of lenses are arranged in an optical axis (optical axis of the imaging device) direction from the object side to the image side (image element side). This lens unit is designed so that an image of an object by visible light can be preferably imaged on the imaging element. Therefore, it is required that the positional relation between the lenses, the positional relation between each lens and the lens barrel, and the positional relation between this lens unit and the image element should be fixed with high accuracy, and a large load should not be applied to each lens.

As a generally used lens, a lens made of a resin material and a lens made of glass are appropriately selected according to the required functions and the like, and these lenses are laminated and fixed inside the lens barrel. A structure of a lens unit having such a structure and a method for manufacturing the same are described in, for example, Japanese Unexamined Patent Publication No. 2018-54922. Here, the surface of the first lens located closest to the object side is exposed on the object side. On the other hand, the second and subsequent lenses adjacent to the first lens on the image side are fixed inside the lens barrel.

In a lens unit as described in Japanese Unexamined Patent Publication No. 2018-54922, as described above, since it is necessary to precisely determine the positional relation between the lens in the lens barrel and the lens barrel, the structure (positioning portion) for determining the positional relation between the second and subsequent lenses and the lens barrel is provided only at the minimum necessary location, and the lens and the lens barrel are often not in contact with each other except at this location. Moreover, even when the lens and the lens barrel are in direct contact with each other, they are actually partially in contact with each other. In this case, between the second and subsequent lenses and the lens barrel is not sealed.

In this case, in the above lens unit, an external temperature is transmitted from the surface of the exposed first lens on the object side to the surface of the first lens on the image side. At this time, if the temperature of the surface of the first lens on the image side is lower than the temperature inside the lens barrel, dew condensation may be generated on the surface of the first lens on the image side and the surface of the second lens on the object side, and the lenses may become foggy.

Therefore, a lens unit that suppresses fogging of the lens has been desired.

At least an embodiment of the present invention has been made in view of such a situation, and an object of at least the embodiment of the present invention is to obtain a lens unit that suppresses fogging of the lens.

SUMMARY

A lens unit according to at least an embodiment of the present invention, comprises: a first lens arranged on an object side in an optical axis direction along an optical axis; a plurality of lenses including a second lens adjacent to the first lens on an image side in the optical axis direction; and a lens barrel to accommodate therein the first lens and the plurality of the lenses; wherein the lens unit further comprises: a first seal member to seal between the first lens and the lens barrel, and a second seal member to seal between the second lens and the lens barrel, and wherein a communication passage to communicate between a space between the first lens and the second lens in the lens barrel and an outside of the lens barrel is provided in the lens barrel, and a third seal member to close the communication passage is provided in the communication passage.

In this configuration, the space between the first lens and the second lens can be separated with the second seal member from the space inside the lens barrel, including and after the second lens, so that the moisture of the air in the space inside the lens barrel, including and after the second lens, or of the air in the space inside the camera module that holds the lens barrel, can be prevented from flowing into the space side between the first lens and the second lens. Therefore, it is possible to prevent any dew condensation from being generated on and fogging the surface of the first lens on the image side and the surface of the second lens on the object side. On the other hand, when this space is sealed by the first seal member and the second, the air in the space between the first lens and the second lens cannot be exhausted and the assembling may be difficult. However, the lens unit can be easily manufactured by sealing the communication passage with the third seal member after flowing the air through the communication passage.

Further, on an outside of the second lens in a radial direction around the optical axis, the lens barrel may be provided with an outer peripheral groove which is a groove in a form of being dug down from the image side toward the object side, and the communication passage may communicate with the outer peripheral groove.

In this configuration, the communication passage communicates with the outer peripheral groove, which makes it particularly easy to allow the air to flow through the communication passage, and makes it particularly easy to manufacture the lens unit and seal the space.

Further, an opening portion, of the communication passage, on an inside of the lens barrel may have such a structure that an opening area when viewed from the inside in the radial direction is provided to be larger than the opening area when viewed from the optical axis direction.

The adhesive to be the third seal member is applied along the depth direction (direction parallel to the optical axis A) of the outer peripheral groove. In this configuration, since the opening area of the communication passage is made small along the flow of the adhesive, leakage of the adhesive into the lens barrel at this time is suppressed.

Further, the second lens may be engaged on the object side by a second lens engagement portion which is a portion, of the lens barrel, that is bent toward a side intersecting the optical axis, and the second seal member may be made of an adhesive that joins the second lens engagement portion with the second lens.

In this configuration, the second lens is fixed to the lens barrel by the second lens engagement portion, and the second lens is more firmly fixed to the lens barrel by the adhesive that becomes the first adhesive layer.

Further, on the object side, the second lens may include a lens surface through which a light ray to form an image passes, and a flange surface located radially outside around the optical axis, and the flange surface may be located on the image side of the lens surface, and the second lens engagement portion may be in contact with the flange surface.

In this configuration, on the object side, the second lens includes the lens surface that optically functions and a flange surface. Of these, by bringing the flange surface into contact with the second lens engagement portion, the second lens can be firmly fixed to the lens barrel while maintaining the optical characteristics of the second lens.

Further, an opening portion, of the communication passage, on an inside of the lens barrel may be provided on the image side of the second lens engagement portion.

In this configuration, since the opening portion of the communication passage is located on the image side of the second lens engagement portion, even if the adhesive to be the second adhesive layer leaks from the communication passage opening to the inside of the lens barrel, the adhesive flowing to the lens surface side of the second lens is blocked by the second lens engagement portion. That is, an adverse effect of leakage of the adhesive that becomes the second adhesive layer is suppressed.

Further, the lens barrel may include a first mounting portion on and to which the first lens is mounted from the object side and fixed, and in the first mounting portion, a plurality of first mounting portion convex portions protruding toward the object side so as to come into contact with the first lens may be provided in a manner to be divided in a circumferential direction around the optical axis, and when viewed from the object side, the communication passage may be provided in the lens barrel so as not to overlap with the first mounting portion convex portions.

In this configuration, the positional relation of the first lens with respect to the lens barrel in the optical axis direction is determined by the first mounting portion convex portions. On the other hand, by not overlapping the communication passage with the first mounting portion convex portions, the positional accuracy of the first lens with respect to the lens barrel can be improved.

Further, the second lens engagement portion may be located on the image side of the lens surface, and the second seal member may embed the second lens engagement portion and may be made of the adhesive, and an opening portion of the communication passage, on an inside of the lens barrel, may be provided on the object side of the second seal member.

In this configuration, by providing the second lens engagement portion on the image side, the first adhesive layer can have a shape including the second lens engagement portion and embedding the periphery thereof. With this, between the second lens and the lens barrel can be more firmly fixed and sealed.

Further, the lens barrel may include a first mounting portion on and to which the first lens is mounted from the object side and fixed, and in the first mounting portion, a plurality of first mounting portion convex portions protruding toward the object side so as to come into contact with the first lens may be provided in a manner to be divided in a circumferential direction around the optical axis, and when viewed from the object side, the communication passage may be provided in the lens barrel so as to overlap with the first mounting portion convex portions.

In this configuration, the positional relation of the first lens with respect to the lens barrel in the optical axis direction is determined by the first mounting portion convex portions. On the other hand, by overlapping the communication passage with the first mounting portion convex portions, the communication passage can be provided more on the object side. With this, the distance between the communication passage and the second seal member (adhesive layer) can be increased. Due to this, the second seal member can be formed thick, or the adhesive before solidification, which becomes the second seal member, can be prevented from flowing to the communication passage.

Further, a cut portion having a distance from the optical axis locally reduced in the circumferential direction may be provided on an outer periphery of the second lens around the optical axis, and a deformed portion composed of a local unevenness may be provided on an opposite side, on the flange surface, of the cut portion, with the optical axis interposed.

In this configuration, the resin molding which uses the molds provided with the gate portion that corresponds to the cut portion, and the degassing portion that corresponds to the deformed portion can easily and precisely manufacture the second lens.

Further, in a region where the cut portion is provided in the circumferential direction, an end portion inside in the radial direction of the second lens engagement portion may be located, in the radial direction, to the inside of the cut portion.

In this configuration, the second lens can be more firmly fixed to the lens barrel by providing the tip end of the second lens engagement portion on the optical axis side of the cut portion, and the adhesive to be the first adhesive layer is suppressed from flowing to the image side of the second lens.

Further, the communication passage may have a shape in which a cross-sectional area perpendicular to a flow path of air flowing through the communication passage becomes smaller toward an inside of the lens barrel.

In this case, it becomes particularly easy to seal, with an adhesive, the opening, of the communication passage, on the inside of the lens barrel.

Further, a step may be provided on an inner surface of the communication passage on the optical axis side so that a cross-sectional area becomes smaller toward an inside of the lens barrel.

In this case, increasing the contact area between the adhesive and the inner surface of the communication passage by this step makes it possible to reliably seal the opening in particular.

Further, the lens barrel may include a first lens outer periphery support portion to support an outer peripheral surface of the first lens around the optical axis on the object side of the first mounting portion, and the first seal member is an O-ring provided between the first lens and the first lens outer periphery support portion and made of an elastic material.

In this case, the O-ring 20, which is the first seal member, can particularly reliably seal between the first lens and the lens barrel. At this time, using the first adhesive layer, the communication passage, and the second adhesive layer can particularly easily manufacture the lens unit.

According to at least the embodiment of the present invention, it is possible to obtain a lens unit in which fogging of a lens is suppressed and the manufacturing of the lens is easy.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, embodiments of the present invention will be described in detail with reference to the drawings.

Figure 1:
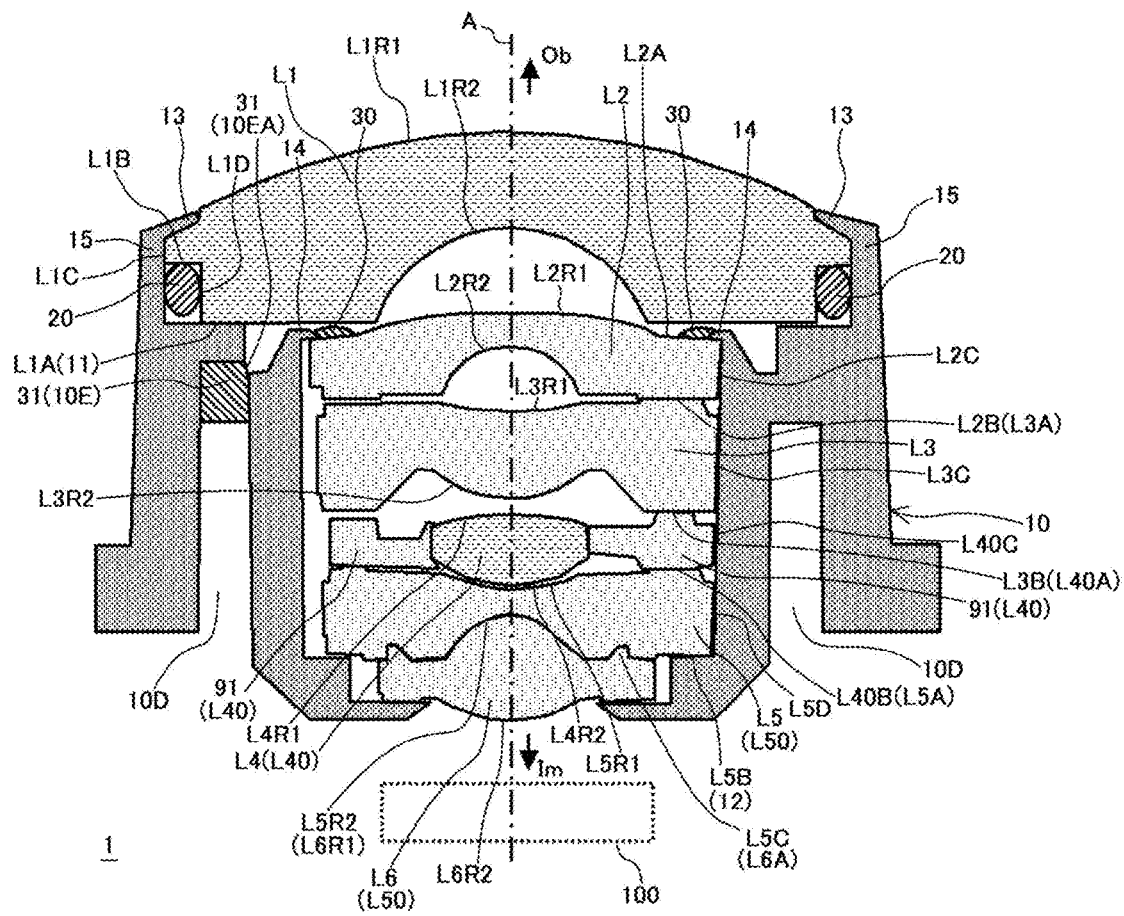
FIG. 1 is a cross-sectional view of a lens unit according to an embodiment.

FIG. 1 is a cross-sectional view of a lens unit 1 along an optical axis A according to the embodiment. Here, an object side is the upper side in the figure, an image side is the lower side in the figure, and an imaging element 100 is located at the lowermost part in the figure. Each of lenses L1 to L6 is directly or indirectly fixed to a lens barrel 10. In FIG. 1, the positional relation between each lens and the lens barrel 10 is mainly described, and in reality, a structure to fix the positional relation between the imaging element 100 and the lens barrel 10 is also provided. However, description of the structure is omitted.

The imaging element 100 is a two-dimensional CMOS image sensor, and each pixel is arranged two-dimensionally in a plane perpendicular to the optical axis A. In reality, the imaging element 100 is covered with a cover glass (not shown). In FIG. 1, the lens unit 1 including a first lens L1 to a sixth lens L6 is configured. The lens unit 1 is configured to form an image of to-be-imaged visible light on the imaging element 100 (image plane) in a desired field of view and in a desired form.

In FIG. 1, the first lens L1 provided on the most object side (upper side in the figure) is a fisheye lens, and mainly determines the field of view, etc. of the imaging device. A second lens L2, a third lens L3, a fourth lens L4, a fifth lens L5, and the sixth lens L6 are sequentially arranged on the imaging element 100 side (image side) of the first lens L1. Each lens has a substantially symmetrical shape around the optical axis A. Further, a diaphragm for limiting the luminous flux and a light-shielding plate for removing unnecessary light are appropriately provided between the lenses, but since these are irrelevant to at least the embodiment of the present invention, the description thereof is omitted in FIG. 1. Further, as will be described below, the adjacent lenses or each lens and the lens barrel come into contact with each other so that the positional relation with each other is fixed, but it is so configured that these come into partial contact only at preset locations. Therefore, in FIG. 1 which is a cross-sectional view in a specific direction, it is shown that there is a place where an air gap is provided between them.

Figure 2:
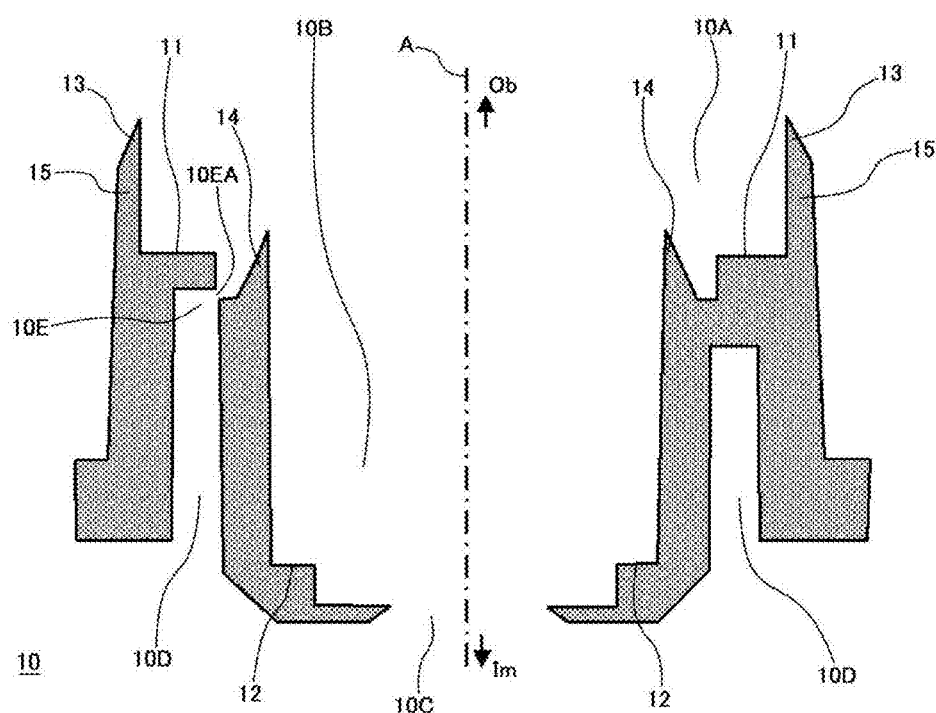
FIG. 2 is a cross-sectional view of a lens barrel used in the lens unit according to the embodiment.
Figure 3:
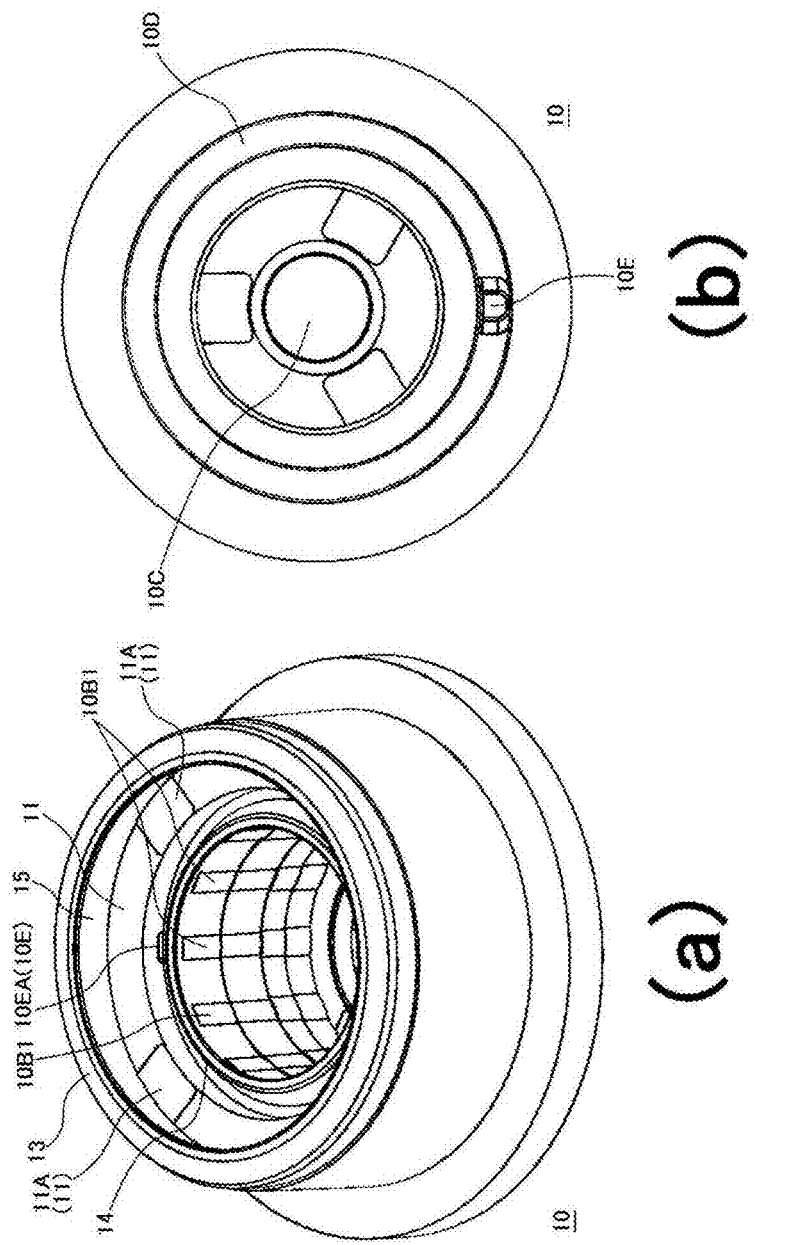
In FIG. 3, (a) is a perspective view of and (b) is a bottom view of the lens barrel used in the lens unit according to the embodiment.

Further, FIG. 2 is a cross-sectional view taken along the optical axis A of only the lens barrel 10. In FIG. 3, (a) is a perspective view of the lens barrel 10 viewed from the diagonally upper side (object side) in FIG. 1, and (b) is a bottom view of the lens barrel 10 as viewed from the image side. On the object side (upper side in the figure) of the lens barrel 10, a first accommodating portion 10A having an inner peripheral surface as substantially a cylindrical cavity portion is provided, and the bottom surface of the first accommodating portion 10A on the image side is a first mounting portion 11 that comes into contact with the first lens L1. However, in order to improve the positional accuracy of the first lens L1 in the optical axis A direction with respect to the lens barrel 10, it is preferable that the first lens L1 and the first mounting portion 11 are not brought into surface contact as a whole, but are caused to contact only at locations dispersed in a plurality of locations. Therefore, as shown in (a) of FIG. 3, in the circumferential direction, the first mounting portion 11 has three first mounting portion convex portions 11A (in the figure, only two of them are displayed) formed in a slightly convex shape toward the object side.

Further, on the image side (lower side in the figure) of the first mounting portion 11, there is provided a second accommodating portion 10B which is a substantially cylindrical cavity portion coaxial with the first accommodating portion 10A and smaller in diameter than the first accommodating portion 10A, and the bottom surface of the second accommodating portion 10B on the image side is a second mounting portion 12 that comes into contact with a most-image-side joint lens L50 which will be described below. The central axes of the first accommodating portion 10A and the second accommodating portion 10B are common and are equal to the optical axis A. Further, as shown in FIG. 2, actually, the inner peripheral surface of the second accommodating portion 10B is gradually reduced from the object side toward the image side.

Further, among the second lens L2 and the lenses on the image side of the second lens L2, those whose outer periphery directly abuts on the inner surface of the second accommodating portion 10B (lens barrel 10) are determined thereby in terms of the positional relation with the lens barrel 10 in the direction (radial direction) perpendicular to the optical axis A. On the other hand, among the second lens L2 and the lenses on the image side of the second lens L2, those whose outer periphery does not directly abut on the inner surface of the second accommodating portion 10B (lens barrel 10) are determined in terms of the positional relation in the radial direction by directly or via another lens indirectly engaging with the one that directly abuts on the inner surface of the second accommodating portion 10B (lens barrel 10). Therefore, in the end, all the positional relations of the second lens L2 and the lenses on the image side of the second lens L2 in the radial direction with respect to the lens barrel 10 are determined. At this time, similarly to the first mounting portion convex portion 11A in the first mounting portion 11, it is preferable that the contact points on the outer periphery are separated into a plurality of contact points in the circumferential direction. Therefore, as shown in (a) of FIG. 3, on the inner surface of the second accommodating portion 10B, a plurality of lens fixing ribs 10B1 each having a slightly convex shape toward the inside (optical axis A side) is formed in the circumferential direction so as to extend along the optical axis A.

Further, as shown in FIG. 2, in the vicinity of the optical axis A on the image side of the lens barrel 10, an image side opening portion 10C that exposes, when viewed from the image side, the sixth lens L6 is formed on the optical axis A side of the second mounting portion 12. Therefore, the image formed by each lens in FIG. 1 can be obtained at the imaging element 100, by the light rays passing through the image side opening portion 10C. Further, the object side of the first mounting portion 11 in the lens barrel 10 is a cylindrical first lens outer periphery support portion 15 that supports the first lens L1 from the outer peripheral side of the first lens L1.

Further, as shown in FIG. 2, an outer peripheral groove 10D in a form dug down from the image side toward the object side is formed on the outside of the second accommodating portion 10B (second mounting portion 12) when viewed from the optical axis A. As shown in (b) of FIG. 3, the outer peripheral groove 10D is formed in an annular shape around the optical axis A.

In FIG. 1, the lens surfaces on the object side and the image side (the surface through which the light rays forming the image pass) in each lens are appropriately machined into curved surfaces (convex curved surface, concave curved surface) so that the lens unit 1 provides desired imaging characteristics. Hereinafter, the lens surface on the object side of each lens is referred to as a first surface R1, and the lens surface on the image side is referred to as a second surface R2. Further, as the shape of the lens surface (convex curved surface or concave curved surface), respectively, the shape of the first surface R1 means the shape viewed from the object side and the shape of the second surface R2 means the shape viewed from the image side.

In general, there are two types of materials constituting a lens in such a small imaging device: glass, and resin material. In the present embodiment, the first lens L1 arranged on the most object side is located on the outermost surface of the lens unit 1, and is therefore made of glass that is not easily scratched. Further, a diaphragm (not shown in FIG. 1) is provided between the third lens L3 and the fourth lens L4, and the fourth lens L4 adjacent to this diaphragm also shows a remarkable change in focal length due to a temperature change, and therefore is made of glass. As the other lenses, one made of an inexpensive resin material is used.

The first lens L1 is a negative lens in which a lens surface L1R1 on the object side thereof is a convex curved surface and a lens surface L1R2 on the image side thereof is a concave curved surface. On the upper surface side of the first lens L1, the lens surface L1R1 occupies almost the entirety. On the lower surface side (image side) of the first lens L1, a first lens first lower surface LIA formed on a plane perpendicular to the optical axis A is provided on the outer side, when viewed from the optical axis A, of the lens surface L1R2. Further outside the first lens first lower surface LIA, there is provided a first lens second lower surface L1B located parallel to the first lens first lower surface LA and closer to the object side (upper side in the figure) than the first lens first lower surface LIA. Further, the outermost peripheral portion of the first lens L1 constitutes a first lens first outer peripheral surface L1C which is cylindrical and has the optical axis A as the central axis. Of these surfaces, the lens surfaces L1R1 and L1R2 are optically used, and the other surfaces are used for fixing the first lens L1 to the lens barrel 10.

In FIG. 1, the upper end side of the lens barrel 10 is a first lens engagement portion 13 bent toward the optical axis A (center) side so as to restrict the movement of the first lens L1 toward the object side. Further, the first lens first lower surface LA actually comes into contact with the first mounting portion convex portion 11A in the first mounting portion 11 of the lens barrel 10 shown in FIG. 2. Therefore, the positional relation of the first lens L1 with respect to the lens barrel 10 in the optical axis A direction is determined by the first lens engagement portion 13 on the object side (upper side in the figure), and by the first mounting portion convex portion 11A on the image side (lower side in the figure).

Further, when the first lens first outer peripheral surface L1C, from the inside, comes into contact with the first lens outer periphery support portion 15 of the lens barrel 10, the positional relation between the first lens L1 and the lens barrel 10 in the radial direction is determined. That is, according to the above configuration, the first lens L1 is fixed to the lens barrel 10.

Here, on the image side of the first lens L1 with respect to the first lens first outer peripheral surface L1C, there is provided a first lens second outer peripheral surface LID which is coaxial and cylindrical and has a diameter smaller than that of the first lens first outer peripheral surface L1C. An annular O-ring (first seal member) 20 made of an elastic material is provided in an annular air gap between the first lens second outer peripheral surface LID and the inner peripheral surface of the first lens outer periphery support portion 15 of the lens barrel 10. As shown in FIG. 1, the O-ring 20 is provided in this air gap in a state of being compressed in a direction perpendicular to the optical axis A (horizontal direction in the figure: radial direction) by the first lens second outer peripheral surface LID and the inner peripheral surface of the first lens outer periphery support portion 15. Therefore, this seals between the first lens L1 (first lens second outer peripheral surface LID) and the lens barrel 10 (first lens outer periphery support portion 15).

The shape of the first lens engagement portion 13 shown in FIG. 1 and (a) of FIG. 3 is a shape after machining for fixing the first lens L1 to the lens barrel 10, and the shape of the upper end portion of the lens barrel 10 is, as shown in FIG. 2, such that the first lens L1 can be inserted into the first accommodating portion 10A from the object side.

The second lens L2 is a negative lens in which a lens surface L2R1 on the object side thereof is a convex curved surface, and a lens surface L2R2 on the image side thereof is a concave curved surface. On the object side (upper side in the figure) of the second lens L2, there is provided a second lens upper surface (flange surface) L2A which is substantially perpendicular to the optical axis A and is located on the image side (lower side in the figure) with respect to the lens surface L2R1. Further, on the image side (lower side in the figure) of the second lens L2, on the outside of the lens surface L2R2, there is provided a second lens lower surface L2B which is substantially perpendicular to the optical axis A and is located on the image side (lower side in the figure) with respect to the lens surface L2R2. A second lens outer peripheral surface L2C, which is the outermost periphery of the second lens L2, comes into contact with the lens fixing rib 10B1 formed on the inner surface of the second accommodating portion 10B. With this, the positional relation between the second lens L2 and the lens barrel 10 in the radial direction is determined.

Further, similarly to the first lens engagement portion 13 with respect to the first lens L1, as shown in FIG. 1, on the lens barrel 10, there is formed a second lens engagement portion 14 bent toward the optical axis A (center) side so as to restrict the movement of the second lens L2 toward the object side. The shape of the second lens engagement portion 14 in FIG. 1 and (a) of FIG. 3 is the shape after the machining to fix the second lens L2 to the lens barrel 10, and the shape on the upper end portion side of the lens barrel 10 before fixing is, as shown in FIG. 2, such that the second lens L2 can be inserted into the second accommodating portion 10B from the object side. Further, as shown in (a) of FIG. 3, the second lens engagement portion 14 is formed over the entire circumference of the second lens L2 around the optical axis A. Therefore, the position of the second lens L2 along the optical axis A direction is limited by the second lens engagement portion 14 on the object side. As shown in FIG. 1, in the state of being fixed in the lens barrel 10, the air gap is formed between the first lens L1 and the second lens L2, in the lens barrel 10.

As shown in FIG. 1, in the second lens upper surface L2A on the object side of the second lens L2, a first adhesive layer (second seal member) 30 made of an adhesive is formed in an annular shape that includes the end portion of the second lens engagement portion 14 on the optical axis A side. With this, the second lens L2 is more firmly fixed to the lens barrel 10, and between the second lens L2 and the lens barrel 10 is sealed.

The third lens L3 is a positive lens in which a lens surface L3R1 on the object side thereof is a concave curved surface, and a lens surface L3R2 on the image side thereof is a convex curved surface. On the object side (upper side in the figure) of the third lens L3, on the outside of the lens surface L3R1, there is provided a third lens upper surface L3A which is substantially perpendicular to the optical axis A and is located on the object side (upper side in the figure) of the lens surface L3R1. Further, on the image side (lower side in the figure) of the third lens L3, on the outside of the lens surface L3R2, there is provided a third lens lower surface L3B which is substantially perpendicular to the optical axis A and is located on the image side (lower side in the figure) with respect to the lens surface L3R2. A third lens outer peripheral surface L3C, which is the outermost surface of the third lens L3, is not clearly shown in FIG. 1, but does not contact the lens fixing rib 10B1 formed on the inner surface of the second accommodating portion 10B.

As described above, the fourth lens L4 is made of glass, and is a positive lens with a lens surface L4R1 on the object side as a convex curved surface, and a lens surface L4R2 on the image side as a convex curved surface. However, unlike other lenses, the fourth lens L4 is housed in the lens barrel 10 in a state of being a fourth lens body L40 which is press-fitted and fixed to and integrated with a lens holder 91 made of a resin material. That is, in a state of being the fourth lens body L40, the fourth lens L4 is treated as a lens in the same manner as the second lens L2 and the third lens L3 each made of the resin material.

On the object side (upper side in the figure) of the fourth lens body L40, the lens holder 91 outside the fourth lens L4 is provided with a fourth lens body upper surface L40A that comes into contact with the third lens lower surface L3B. Further, on the image side (lower side in the figure) of the fourth lens body L40, the lens holder 91 outside the fourth lens L4 is provided with a fourth lens body lower surface L40B substantially perpendicular to the optical axis A.

Further, a fourth lens body outer peripheral surface L40C, which is the outermost surface of the fourth lens body L40, comes into contact with the lens fixing rib 10B1 formed on the inner surface of the second accommodating portion 10B. With this, the positional relation between the fourth lens body L40 (fourth lens L4) and the lens barrel 10 in the radial direction is determined.

The fifth lens L5 is a negative lens in which a lens surface L5R1 on the object side thereof is a concave curved surface, and the lens surface L5R2 on the image side thereof is a concave curved surface. The sixth lens L6 is a positive lens having an outer diameter smaller than that of the fifth lens L5, a lens surface L6R1 on the object side having a convex curved surface, and a lens surface L6R2 on the image side having a convex curved surface. Further, with the opposing lens surfaces fit and joined, the fifth lens L5 and the sixth lens L6 are set so as to form the joint lens L50 closest to the image side. That is, the image-side lens, which is substantially the most-image-side lens, is the joint lens L50 in which the lens surface L5R2 of the fifth lens L5 on the image side and the lens surface L6R1 of the sixth lens L6 on the object side are fitted and joined.

On the object side (upper side in the drawing) of the joint lens L50 (fifth lens L5), on the outside of the lens surface L5R1, a fifth lens upper surface L5A that comes into contact with the fourth lens body lower surface L40B of the fourth lens body L40 is provided. Further, on the image side (lower side in the drawing) of the fifth lens L5, a joint lens lower surface L5B which is a plane perpendicular to the optical axis A is provided outside the lens surface L5R2 (lens surface L6R1). The joint lens lower surface L5B is in contact with the second mounting portion 12, and the sixth lens L6 is not in direct contact with the lens barrel 10. Further, a step portion (engagement structure) L5C having a concave shape toward the object side is provided inside the second mounting portion 12 of the joint lens lower surface L5B. Correspondingly to this, the sixth lens L6 on the object side is provided with a step portion (engagement structure) L6A having a convex shape, and the step portion L5C and the step portion L6A engage with each other. That is, in the joint lens L50, the lens surface L5R2 and the step portion L5C of the fifth lens L5, and the lens surface L6R1 and the step portion L6A of the sixth lens L6 are fixed in a state of being respectively fitted, and thereby the positional relation between the fifth lens L5 and the sixth lens L6 in the optical axis A direction and the radial direction is determined.

Further, a fifth lens outer peripheral surface L5D, which is the outermost surface of the joint lens L50 (fifth lens L5), comes into contact with the lens fixing rib 10B1 formed on the inner surface of the second accommodating portion 10B. Therefore, the positions of the joint lens L50 along the optical axis A and the radial direction are fixed with respect to the lens barrel 10.

In this case, since the fourth lens body L40 is engaged to the joint lens L50 on the image side, the position of the fourth lens body L40 in the direction along the optical axis A is, on the image side, limited by the second mounting portion 12 (lens barrel 10) via the joint lens L50. The same applies to the third lens L3 and the second lens L2.

Further, in the above configuration, the second lens L2, the fourth lens body L40 (fourth lens L4), and the joint lens L50 have their respective outer peripheral surfaces come into contact with the lens barrel 10, thereby determining respective positional relations in the radial direction with respect to the lens barrel 10. On the other hand, on the third lens lower surface L3B in the third lens L3 and the fourth lens body upper surface L40A body in the fourth lens body L40, engaging portions (not shown) for fixing their positional relation in the radial direction are formed. Therefore, the positional relation of the third lens L3 with respect to the lens barrel 10 is indirectly determined via the fourth lens body L40.

Therefore, in the above configuration, the positional relation with the lens barrel 10 in the radial direction is also fixed for all lenses other than the first lens L1. On the other hand, in all the lenses other than the first lens L1, the adjacent lenses are in contact with each other in the optical axis A direction, and the joint lens L50 closest to the image side is in contact with the second mounting portion 12. Therefore, the positions of all the lenses other than the first lens L1 along the optical axis A direction are limited by the second mounting portion 12 on the image side.

On the other hand, as described above, the positional relation of the second lens L2 with the lens barrel A in the optical axis A direction is limited by the second lens engagement portion 14 on the object side. Therefore, the positional relation of all lenses, other than the first lens L1, with respect to the lens barrel 10 in the optical axis A direction is fixed. Since the positional relations with respect to the first lens L1 and the lens barrel 10 is fixed as described above, in the end, the positional relations between all the lenses in the above structure and the positional relations with respect to all the lenses and the lens barrel 10 are fixed in the optical axis A direction and the radial direction.

Figure 4:
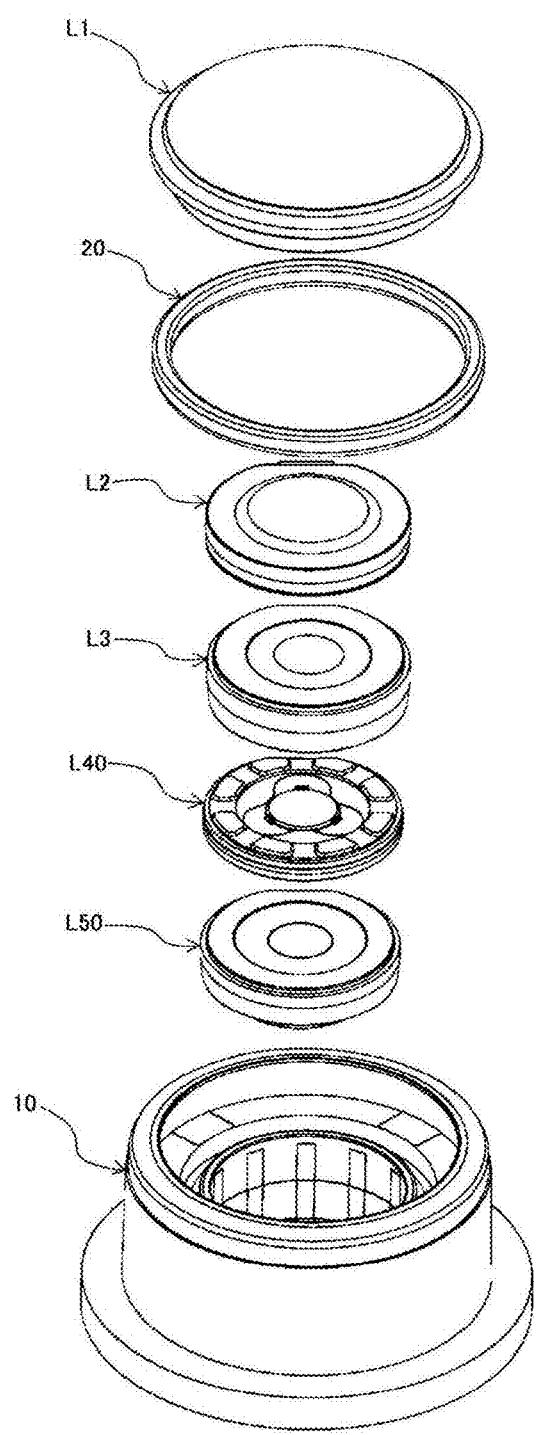
FIG. 4 is an exploded assembly view of the lens unit according to the embodiment.

FIG. 4 is an exploded perspective view of the lens unit 1, and the description of the light-shielding plate and the diaphragm is omitted here as well. Here, the joint lens L50, the fourth lens body L40, the third lens L3, the second lens L2, the O-ring 20, and the first lens L1 are sequentially mounted on the lens barrel 10 from the upper side (object side) in the drawing. Here, the description of the first adhesive layer 30 and the like is omitted.

As the material of the lens barrel 10, crystalline plastics (polyethylene, polyamide, polytetrafluoroethylene) having excellent weather resistance are preferably used. On the other hand, the second lens L2, the third lens L3, the fifth lens L5, and the sixth lens L6 are each made of an amorphous plastic (polycarbonate or the like) having excellent performance (light transmission and moldability) as a lens. Further, since the lens holder 91 is made of the same amorphous plastic as the third lens L3 and the like, the fourth lens body L40 can be treated as a plastic lens similar to the third lens L3 and the like as a whole. As described above, the first lens L1 and the fourth lens L4 are made of glass.

Here, in FIG. 1, since the space between the first lens L1 and the second lens L2 is sealed, it is possible to suppress the fogging from occurring to the lens surfaces L1R2 and L2R1 in this space. The structure for this will be described below.

As described above, between the first lens L1 (first lens second outer peripheral surface L1D) and the lens barrel 10 (inner peripheral surface of the first lens outer periphery support portion 15) is sealed by the O-ring 20. Further, between the second lens L2 and the lens barrel 10 is also sealed by the first adhesive layer 30.

However, as shown in FIG. 2, in the lens barrel 10 in the state before manufacturing of the lens unit 1, a communication passage 10E that communicates the inside of the second accommodating portion 10B (lens barrel 10) with the outer peripheral groove 10D (outside of the lens barrel 10) is formed on the object side (upper side in the drawing) of the outer peripheral groove 10D on the left side in FIG. 2. As described above, the outer peripheral groove 10D is formed over the entire circumference around the optical axis A, whereas the communication passage 10E is formed only in a part of the circumferential direction around the optical axis A, and an opening (communication passage opening (opening portion) 10EA) on the second accommodating portion 10B side is formed only in a part of the circumferential direction in (a) of FIG. 3. In FIG. 1 shows the cross-sectional view of the lens unit 1 in a place where the communication passage 10E (left side in the figure) is formed. However, in the state of FIG. 1 after manufacturing, the communication passage 10E is sealed by a second adhesive layer (third seal member) 31 composed of an adhesive.

Since between the first lens L1 and the lens barrel 10 and between the second lens L2 and the lens barrel 10 are sealed as described above, the space between the first lens L1 and the second lens L2 can be communicated with the outside air via the outer peripheral groove 10D, only in the place where the communication passage opening 10EA is present.

The effect of providing the communication passage 10E in this way in the manufacturing process of the lens unit 1 will be described below.

FIG. 5 to FIG. 9 are process cross-sectional views each showing a state when the lens unit 1 is manufactured. First, in (a) of FIG. 5, into the second accommodating portion 10B, the joint lens L50, the fourth lens body L40, and the third lens L3 are mounted sequentially from upper side (object side) in the figure so as to be brought into the state, with respect to the lens barrel 10, shown in FIG. 1. At this time, as described above, the positional relation of each of these lenses (lens body) with respect to the lens barrel 10 in the optical axis A direction and the radial direction is fixed.

Figure 5:
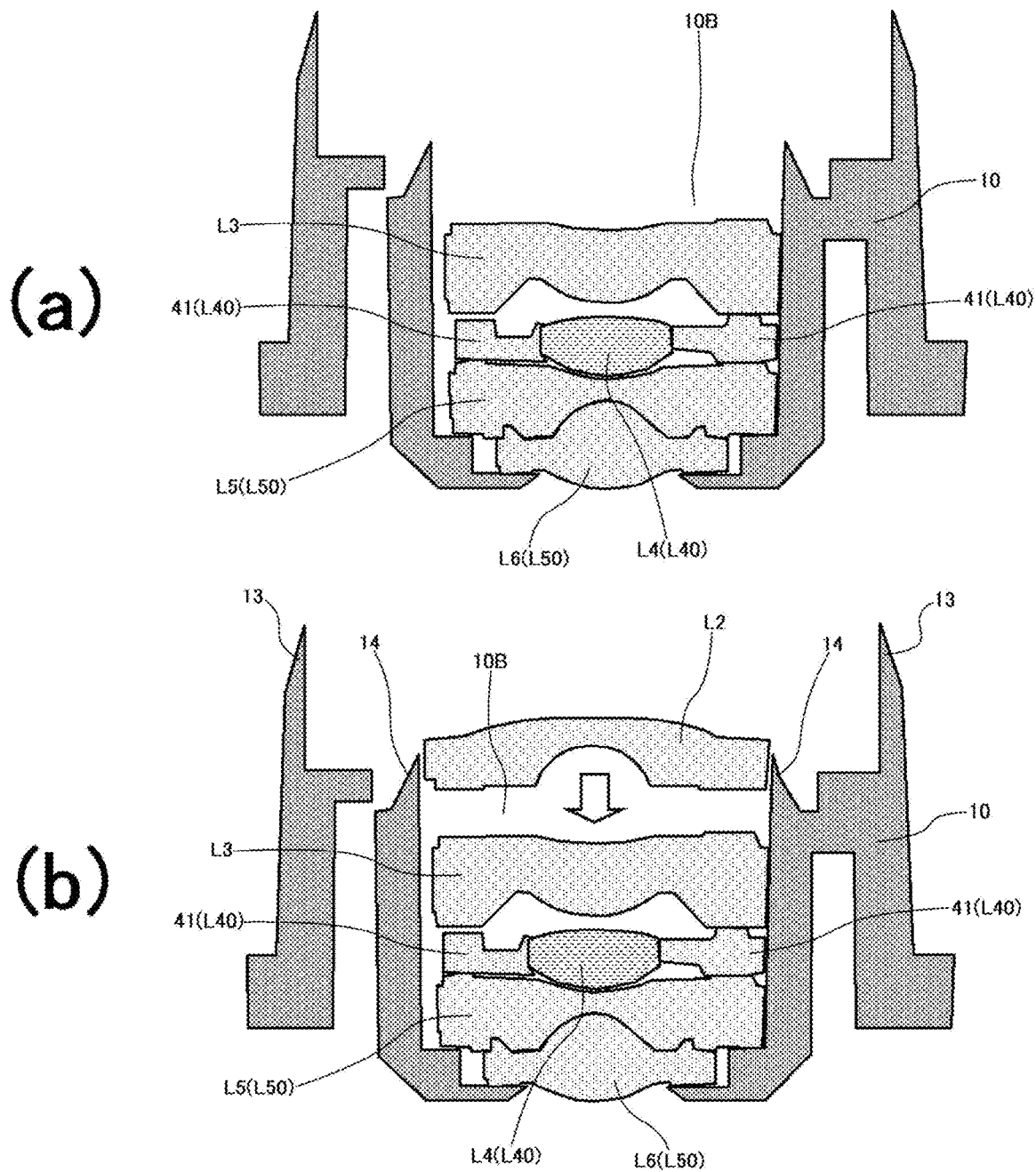
FIG. 5 is a process cross-sectional view (No. 1) when the lens unit according to the embodiment is manufactured.

Next, from this state, as shown in (b) of FIG. 5, the second lens L2 is mounted from the upper side in the drawing. At this time, since the second lens engagement portion 14 is in the state before machining as described above, the second lens L2 can be inserted in this way into the second accommodating portion 10B from the upper side in the drawing.

Figure 6:
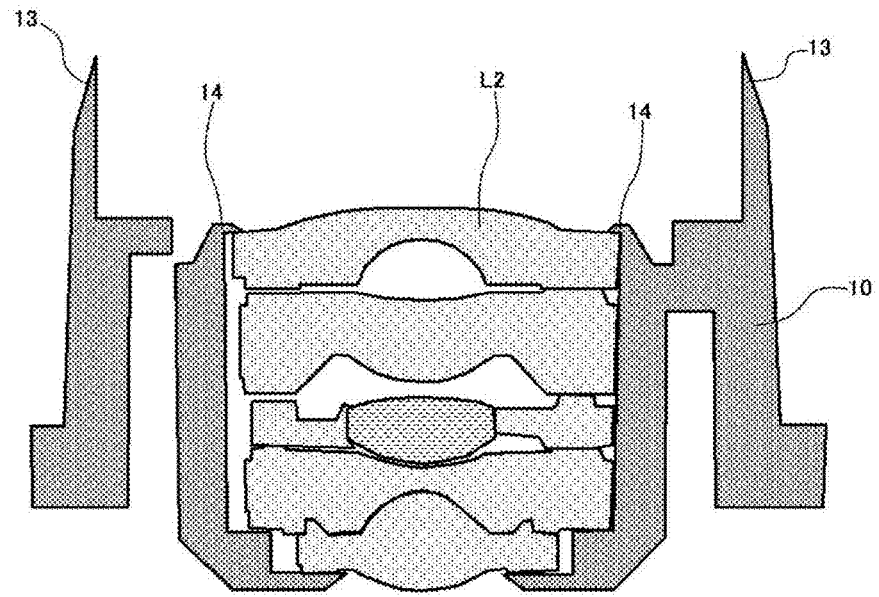
FIG. 6 is a process cross-sectional view (No. 2) when the lens unit according to the embodiment is manufactured.
Figure 6:
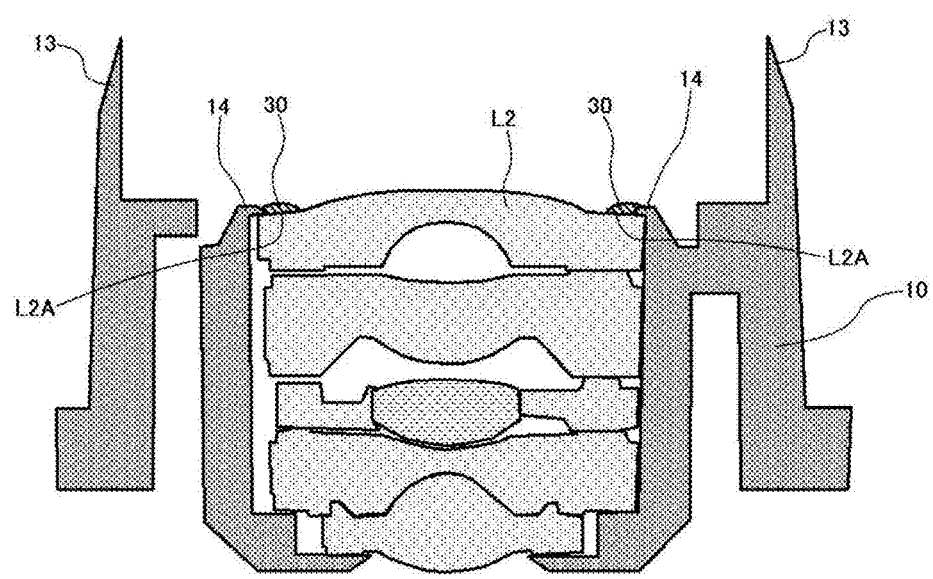

After the second lens L2 is fixed in the lens barrel 10 in the state shown in FIG. 1, the second lens engagement portion 14 is swaged as shown in (c) of FIG. 6, thereby the second lens L2 in this state is fixed to the lens barrel 10 in a predetermined positional relation. Therefore, at this time point, all lenses other than the first lens L1 are fixed to the lens barrel 10.

After that, as shown in (d) of FIG. 6, in this state, on the second lens upper surface L2A, applying and solidifying an adhesive before solidification forms the first adhesive layer 30 into an annular shape that includes the end portion of the second lens engagement portion 14 on the optical axis A side. With this, between the second lens L2 and the lens barrel 10 is sealed. As the adhesive constituting the first adhesive layer 30, for example, a silicone-based adhesive or an acrylic-based adhesive can be used.

Figure 7:
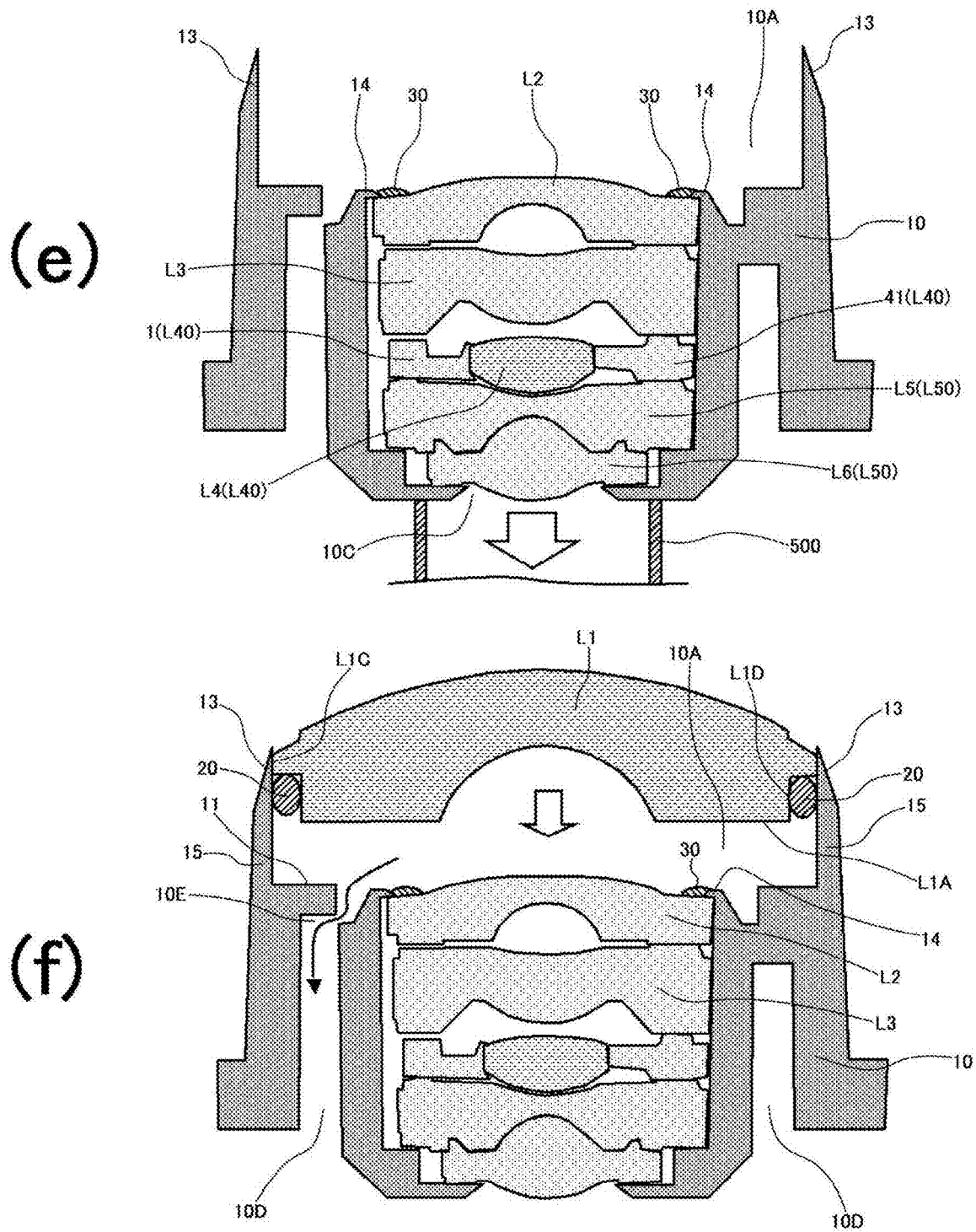
FIG. 7 is a process cross-sectional view (No. 3) when the lens unit according to the embodiment is manufactured.

In this state, as shown in (e) of FIG. 7, an airtightness tester (vacuum pump) 500 is connected to a region including the image side opening portion 10C to reduce the pressure inside the lens barrel 10, thus making it possible to perform a test (leak check) of the airtightness by sealing with the first adhesive layer 30. As described above, since the contact points between the third lens L3 to the joint lens L50 and the lens barrel 10 are local, many air gaps are actually formed between them, and in this case, since the area with the lens barrel 10 is sealed only by the first adhesive layer 30, such an airtightness test is possible.

After confirming the airtightness with this, then, as shown in (f) of FIG. 7, the first lens L1 in the state where the O-ring 20 is mounted on the first lens second outer peripheral surface L1D is inserted into the first accommodating portion 10A (first lens outer periphery support portion 15). Since the first lens engagement portion 13 is in the state before machining as described above, the first lens L1 can be inserted in this way into the first accommodating portion 10A from the upper side in the drawing.

At this time, the O-ring 20 is compressed in the radial direction, and even in a state before the first lens L1 coming into contact with the first mounting portion 11 as shown in (f) of FIG. 7, between the first lens L1 and the lens barrel 10 is sealed. Since between the second lens L2 and the lens barrel 10 is also sealed at this time point as described above, the air of the space between the first lens L1 and the second lens L2, during the period for pushing down the first lens L1 toward the image side from the state shown in (f) of FIG. 7, as shown by a black arrow in the figure, moves out of the lens barrel 10 via the communication passage 10E and the outer peripheral groove 10D. Therefore, this work can be easily performed by providing the communication passage 10E. Further, when the communication passage 10E is not provided, the space between the first lens L1 and the second lens L2 is sealed from the outside in the state of (f) of FIG. 7, so that the work of pushing down the first lens L1 from the state shown in (f) of FIG. 7 toward the image side is performed against the pressure of the air compressed in this space, thus making it difficult to mount the first lens L1 to the lens barrel 10 as shown in FIG. 1.

Figure 8:
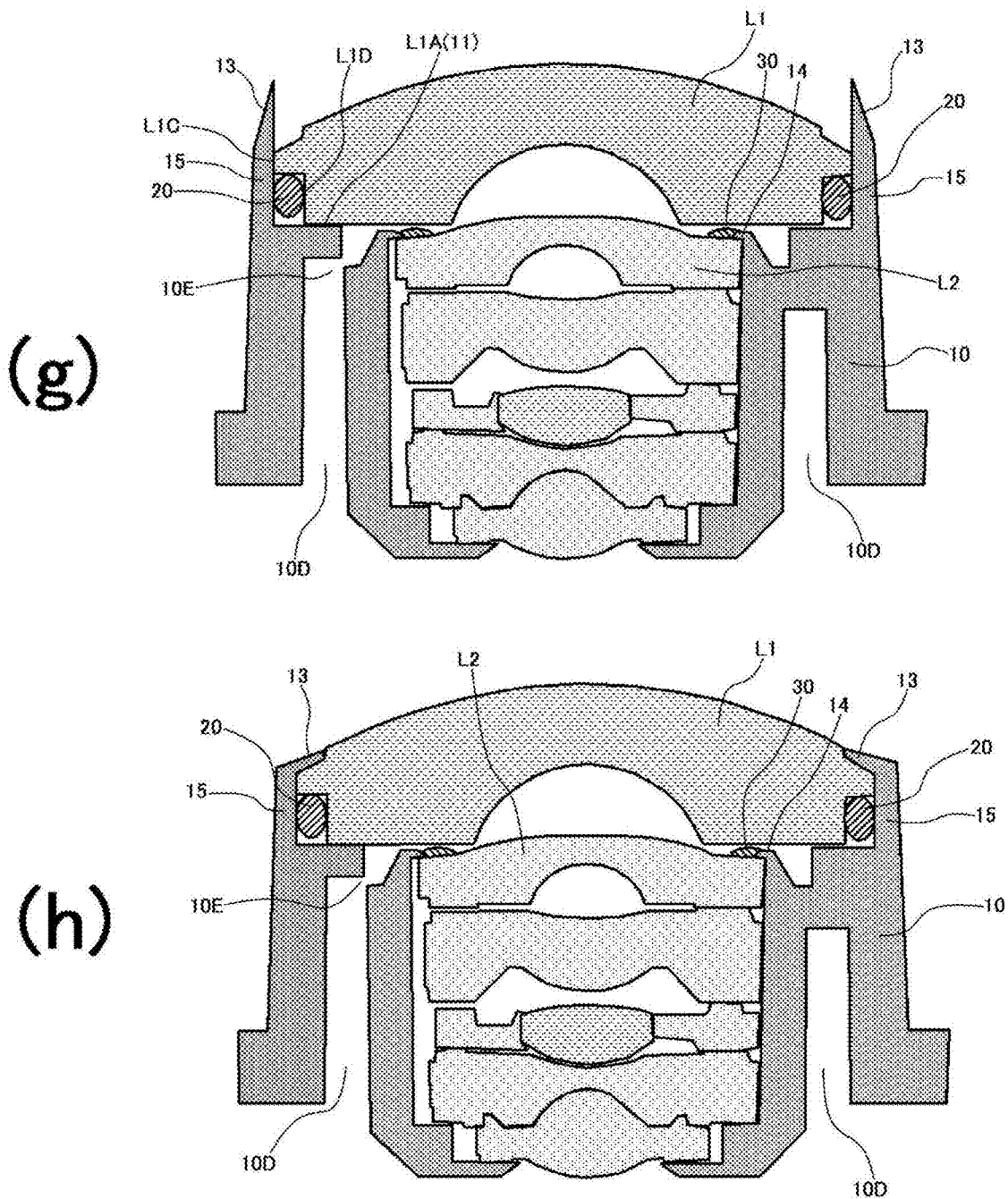
FIG. 8 is a process cross-sectional view (No. 4) when the lens unit according to the embodiment is manufactured.

Then, as shown in (g) of FIG. 8, after the first lens L1 is installed at the position shown in FIG. 1, as shown in (h) of FIG. 8, the first lens engagement portion 13 is machined into the state shown in FIG. 1, to thereby fix the first lens L1 to the lens barrel 10.

Figure 9:
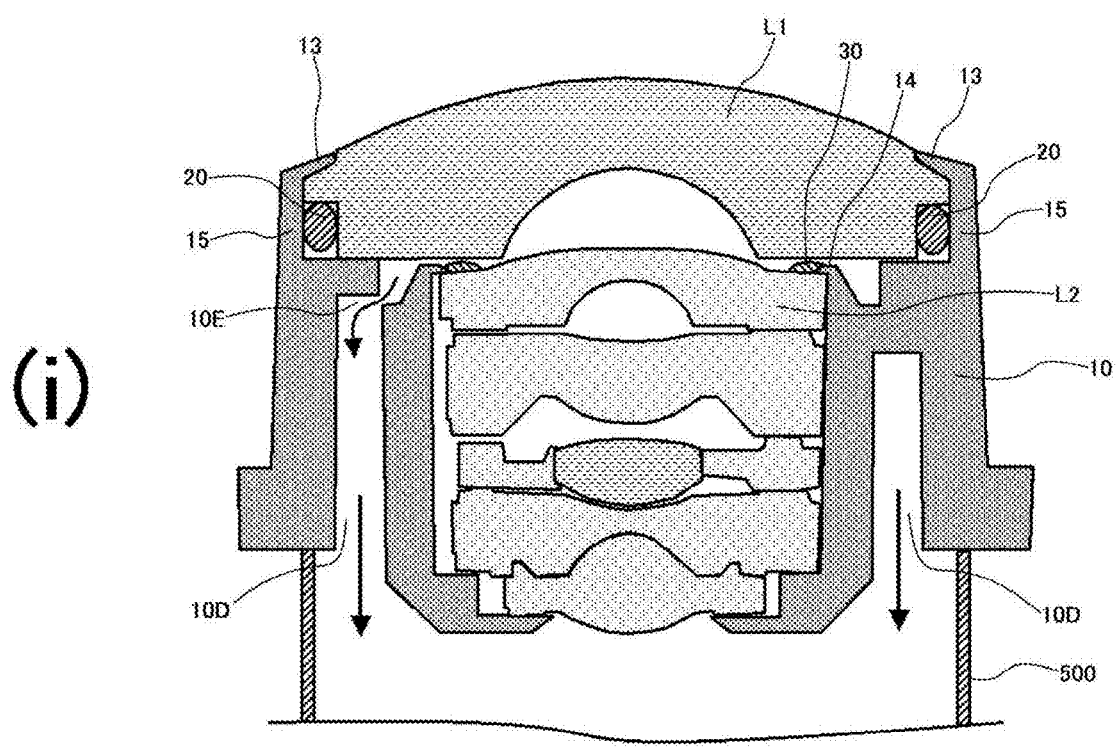
FIG. 9 is a process cross-sectional view (No. 5) when the lens unit according to the embodiment is manufactured.

In this state, as shown in (i) of FIG. 9, the airtightness tester 500 is connected to the region including the outer peripheral groove 10D, and the test of airtightness by the O-ring 20 can be performed. At this time, the air pressure on the outside (object side) of the first lens L1 may be increased. When this airtightness test is passed, the second adhesive layer 31 can be formed by applying the adhesive before solidification to the communication passage 10E from the outer peripheral groove 10D around the communication passage 10E and by curing the adhesive, thus realizing the form shown in FIG. 1.

By providing the communication passage 10E in the lens barrel 10 in this way, it is possible to particularly easily perform the work of sealing the space between the first lens L1 and the second lens L2. With this, it is possible to easily manufacture the lens unit 1 that suppresses fogging from occurring to the first lens L1 and the second lens L2.

In FIG. 1, in the outer peripheral groove 10D, the adhesive before solidification is applied from the image side (lower side in the figure) to the object side (upper side in the figure). At this time, when the adhesive flows to the lens surface L2R1 side of the second lens L2 and the lens surface L1R2 side of the first lens L1, the imaging characteristics deteriorate due to this, so that it is preferable to suppress the adhesive from flowing from the communication passage opening 10EA to the space side (inside the lens barrel 10) between the first lens L1 and the second lens L2. On the other hand, in the above configuration, in FIG. 2 and the like, the communication passage opening 10EA is so formed that an opening area in the horizontal direction (direction perpendicular to the direction in which the adhesive before solidification is applied) in the drawing when viewed from the inside in the radial direction is large and the opening area when viewed from the vertical direction (optical axis A direction) in the figure is small. By forming the communication passage opening 10EA in this way, it is possible to suppress the adhesive before solidification from entering this space.

Further, even if the communication passage opening 10EA is provided only in a small part of the outer peripheral groove 10D in the circumferential direction, the function of the communication passage 10E as an air passage as described above is realized. On the other hand, the smaller the opening area of the communication passage opening 10EA is, the more the flow of the adhesive to the space side between the first lens L1 and the second lens L2 is suppressed. Therefore, as shown in (a) of FIG. 3, the communication passage opening 10EA is formed with a small opening area only in a part in the circumferential direction.

At this time, as shown in (a) of FIG. 3, the communication passage 10E (communication passage opening 10EA) is formed between the adjacent first mounting portion convex portions 11A in the circumferential direction, and the first mounting portion convex portion 11A and the communication passage 10E do not overlap when viewed from the direction along the optical axis A. In the vicinity where the communication passage 10E in the lens barrel 10 is formed, it may be difficult to obtain the molding accuracy of the lens barrel 10 as compared with the portion where the communication passage 10E is not formed. When the first mounting portion convex portion 11A and the communication passage 10E overlap, the positional accuracy of the first lens L1 with respect to the lens barrel 10 may deteriorate. As shown in (a) of FIG. 3, deterioration of the positional accuracy of the first lens L1 can be suppressed by providing the communication passage 10E between the adjacent first mounting portion convex portions 11A.

Further, as shown in FIG. 1, the communication passage opening 10EA is formed on the image side (lower side in the drawing) of the second lens upper surface L2A after the fixing of the second lens L2. With this, even if the adhesive before solidification flows out into the lens barrel 10, the second lens engagement portion 14 protruding toward the object side (upper side in the figure) between the second lens upper surface L2A and the communication passage 10E can block this flow. By setting the form of the communication passage 10E and the position of the communication passage opening 10EA as described above, it is possible to suppress the adhesive from adhering to the lens surface L2R1 of the second lens L2 and the lens surface L1R2 of the first lens L1.

Figure 10:
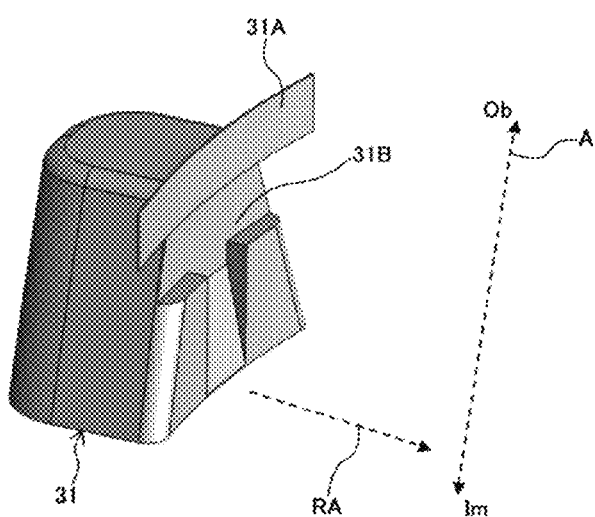
FIG. 10 is a perspective view showing the shape of a third seal member (communication passage) in the lens unit according to the embodiment.

FIG. 10 is a perspective view showing the shape of only the second adhesive layer 31 in FIG. 1 as viewed from the object side and the optical axis A side, and this shape reflects the internal structure as it is from the outer peripheral groove 10D to the communication passage opening 10EA. This shape is such that the adhesive before solidification is filled without a gap in the inner portion from the outer peripheral groove 10D to the communication passage 10E, and the sealing by the second adhesive layer 31 is surely performed. A plate-shaped portion 31A on the upper side in the figure corresponds to the communication passage opening 10EA.

Since the width perpendicular to the optical axis A and a radial direction RA in this shape is shaped so as to become smaller toward the object side in the optical axis A direction, this portion can be reliably closed. Further, a step is formed on a surface (a second adhesive layer inner peripheral surface 31B) on the side close to the optical axis A in the radial direction RA so as to make a T shape when viewed from the optical axis A side. The step is formed so that the width along the radial direction RA is smaller on the object side than the step, or this width is smaller on the central side in the circumferential direction than the step. By forming such a step inside from the outer peripheral groove 10D to the communication passage 10E, the contact area between the adhesive and the inner surface of this portion is increased, and it is difficult to move the adhesive in the state before solidification, and the second adhesive layer 31 can be reliably formed.

Figure 11:
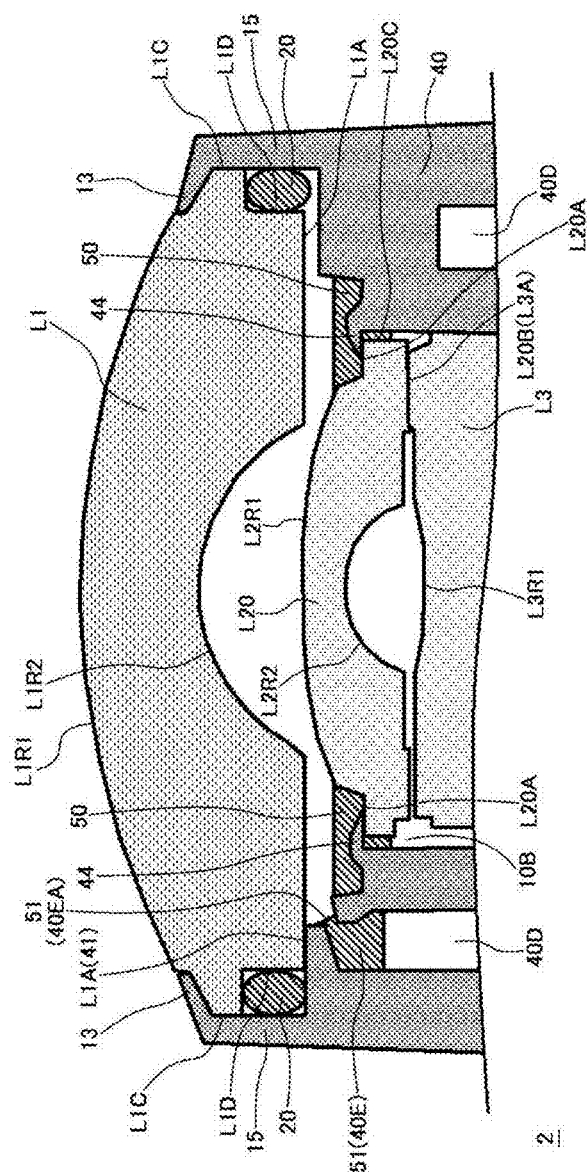
FIG. 11 is a cross-sectional view of a modified example of the lens unit according to the embodiment.

Next, a modified example of the lens unit 1 will be described. FIG. 11 is a cross-sectional view taken along the optical axis A, showing a part of the structure of the lens unit 2. The structure on the image side of the third lens L3 is the same as that of the lens unit 1 described above, and therefore, description thereof is omitted. Further, since the same applies to the structure related to the fixing of the first lens L1 and its outer peripheral portion, in a lens barrel 40 used here, the first lens engagement portion 13, the first lens outer periphery support portion 15, and the like are provided in the same way. The major difference between the lens unit 2 and the lens unit 1 is the shape of the second lens and the structure related to its fixation. In particular, this point will be described below.

A second lens L20 used here includes the same lens surfaces L2R1 and L2R2 as described above. However, a second lens upper surface L20A outside the lens surface L2R1 on the object side is formed on the image side (lower side in the drawing) with respect to the second lens upper surface L2A. On the other hand, a second lens lower surface L20B is the same as the second lens lower surface L2B, which is radially outside the lens surface L2R2 on the image side. Therefore, the second lens L20 has the same optical characteristics as those of the second lens L2 because the lens surface of the second lens L20 is the same as that of the second lens L2, but is formed thinner in the periphery than the second lens L2.

Figure 12:
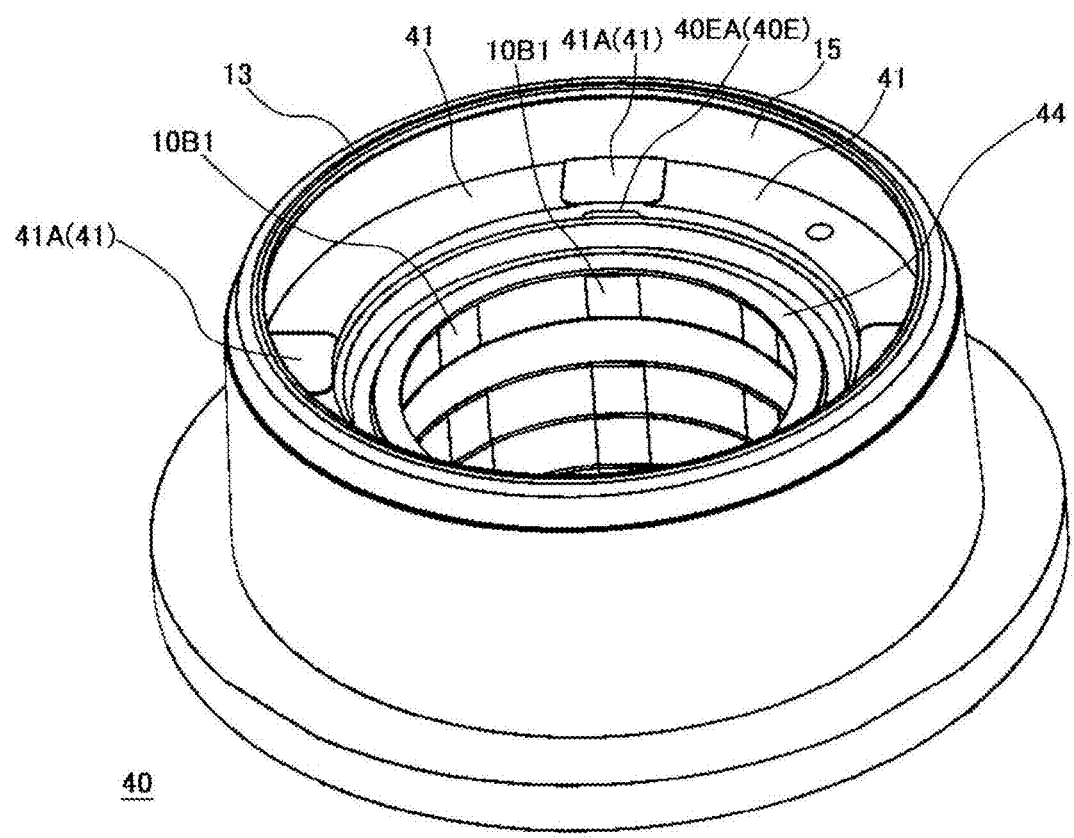
FIG. 12 is a perspective view of a lens barrel used in the modified example of the lens unit according to the embodiment.

Corresponding to this, in the lens barrel 40, a second lens engagement portion 44 is also provided more on the image side than the second lens engagement portion 14. FIG. 12 is a perspective view of the lens barrel 40, and corresponds to (a) of FIG. 3. Here, too, the shapes of the first lens engagement portion 13 and the second lens engagement portion 44 after machining are shown. The first lens engagement portion 13, the first lens outer periphery support portion 15, and the like are the same as those of the lens barrel 10.

In FIG. 11, the entirety around the second lens engagement portion 44 in the lens barrel 40 is dug deeper than in the case of the lens unit 1 (FIG. 1). Therefore, in the lens unit 1, the first adhesive layer 30 is formed only near the end portion of the second lens engagement portion 14 on the optical axis A side ((d) of FIG. 6), whereas, in the lens unit 2, a first adhesive layer 50 is formed so as to embed the second lens engagement portion 44 and fill the portion thus dug down. At this time, the adhesive before solidification is poured into the portion dug down in this way, and as shown in FIG. 11, is also filled to the gap (where the lens fixing rib 10B1 is not formed) between a second lens outer peripheral surface L20C of the second lens L20 and the inner surface of a second accommodating portion 40B. Therefore, after the adhesive is solidified, the first adhesive layer 50 makes the fixing and sealing of the second lens L20 to the lens barrel 40 stronger than those of the lens unit 1. The step of forming a second adhesive layer (third seal member) 51 in a communication passage 40E is the same as that in the case of the lens barrel 10, and the airtightness test before this is also performed in the same manner.

In this case, a communication passage opening 40EA is formed closer to the object side (upper side in FIG. 11) than in the case of the lens barrel 10 so as not to be blocked by the adhesive constituting the first adhesive layer 50. At this time, as shown in FIG. 12, in the lens barrel 40, a first mounting portion 41 and a first mounting portion convex portion 41A that support the first lens L1 on the image side are formed in the same manner as in the lens barrel 10 described above. When viewed from the optical axis A direction, the communication passage 40E is formed so as to overlap the first mounting portion convex portion 41A in the circumferential direction. Since the first mounting portion convex portion 41A has a convex shape toward the object side, it is possible to make it easier to provide especially the communication passage opening 40EA more on the object side, and blocking of the communication passage opening 40EA by the unsolidified adhesive that becomes the first adhesive layer 50 is suppressed. Alternatively, due to this, the first adhesive layer 50 can be formed thicker, and the second lens L2 can be fixed and sealed more reliably.

Figure 13:
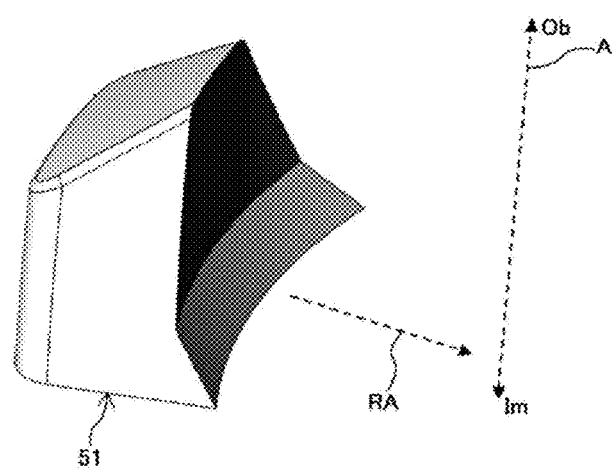
FIG. 13 is a perspective view showing the shape of a third seal member (communication passage) in the modified example of the lens unit according to the embodiment.

FIG. 13 is a perspective view corresponding to FIG. 10, showing the shape of only the second adhesive layer 51 in this case. This shape directly reflects the internal structure from an outer peripheral groove 40D to the communication passage opening 40EA. Even in this case, the shape is realized so that the path toward the communication passage opening 40EA on the object side along the optical axis A and on the side (inside) toward the optical axis A is narrowed. That is, since the width perpendicular to the optical axis A and the radial direction RA is shaped so that the width along the radial direction RA becomes smaller toward the object side, this portion can be securely closed and sealed.

Figure 14:
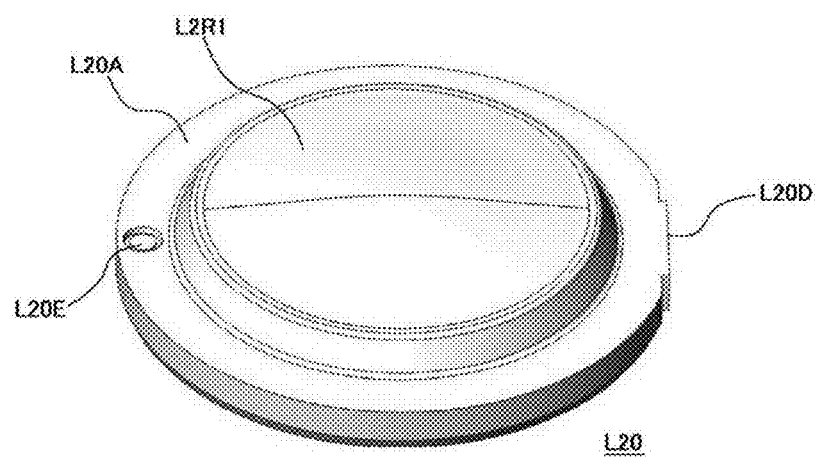
FIG. 14 is a perspective view of a second lens in the modified example of the lens unit according to the embodiment.
Figure 15:
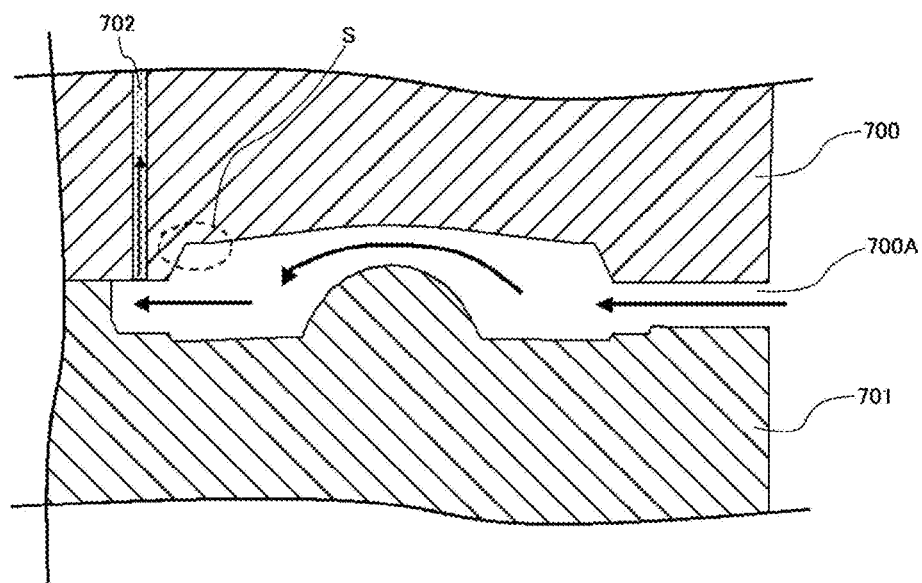
FIG. 15 is a perspective view showing a form when the second lens is manufactured.

Further, as described above, the second lens L20 is formed so that the periphery thereof is particularly thin as compared with the center thereof, and the second lens L20 can be manufactured by molding using a mold. This point will be described below. FIG. 14 is a perspective view of the second lens L20 as viewed from the object side, and FIG. 15 is a cross-sectional view showing a situation when the second lens L20 is manufactured using a mold. This cross section corresponds to the cross section of the second lens L20 in FIG. 12 (cross section along the optical axis A).

In this case, a first mold 700 having an inner surface shape corresponding to the object-side shape (lens surface L2R1 or the like) of the second lens L20 and a second mold 701 having an inner surface shape corresponding to the image-side shape (lens surface L2R2 or the like) of the second lens L20 are used in combination. The shape of the cavity between the first mold 700 and the second mold 701 in FIG. 15 corresponds to the cross-sectional shape of the second lens L20 in FIG. 11, and the liquid resin material before solidification in this state is poured into this cavity from a gate 700A which is the entrance provided on the right side in the drawing. In FIG. 15, the flow of the resin material at this time is illustrated by arrows.

Here, the shape and position of the lens surface L2R1 of the second lens L20 are the same as those of the second lens L2, but the second lens upper surface L20A around the lens surface L2R1 is lower than the second lens upper surface L2A. For this reason, the step in the portion of a region S in FIG. 15 becomes large, so that gas tends to accumulate in this region S.

In order to release the gas accumulated in the region S, it is effective to degas the air from the side far from the gate 700A and the side having such a step (the side with the region S). For this reason, in FIG. 15, a degassing portion 702 is provided on the left side portion of the first mold 700 in the drawing. At this time, for a path for degassing the gas, even a small cross-sectional area of the flow path through which the gas flows is enough, and a large amount of resin material flowing into the path is not preferable. Therefore, for example, a simple cylindrical shape may be used as the degassing portion 702, and the first mold 700 is formed with a through hole in a manner that the degassing portion 702 passes therethrough in the vertical direction as shown in FIG. 15. In this case, the gas flows through the gap between the outer periphery of the degassing portion 702 and the inner surface of the through hole in the first mold 700. In this case, the cross-sectional area perpendicular to the flow in the flow path becomes small, but a sufficient effect is obtained for the degassing as described above. On the other hand, there is a possibility that the resin material may flow into a part of this flow path and solidify, but this part is divided when the second lens L20 after molding is taken out, and in the second lens L20 after molding, this portion becomes a burr-like convex portion.

In the perspective view of FIG. 14, the portion (cut portion L20D) cut linearly in the circumferential direction on the right side is a portion corresponding to the gate 700A in FIG. 15. The distance, of the cut portion L20D, from the optical axis A is locally smaller than that of the rest, and the cut portion L20D becomes one region in the circumferential direction. Therefore, the cut portion L20D does not come into contact with the inner surface of the lens barrel 40, and does not affect the positional relation between the second lens L20 and the lens barrel 40.

On the other hand, on the left side of the second lens upper surface (flange surface) L20A in the drawing, a portion corresponding to the degassing portion 702 is formed as a local concave portion, and a convex portion corresponding to the burr is formed inside the concave portion. Therefore, this portion becomes a portion dug down in an annular shape on the left side in FIG. 14 (a portion composed of a local unevenness: a deformed portion L20E). From the configuration of FIG. 15, the deformed portion L20E is formed on the opposite side of the cut portion L20D with the optical axis A interposed. Since the second lens L20 is not in contact with the first lens L1, the deformed portion L20E causes no influence to the positional relation between the second lens L20 and the first lens L1 unless the protrusion amount of the convex portion of the deformed portion L20E is large.

However, in FIG. 11, it is preferable that the end portion of the second lens engagement portion 44 on the optical axis A side is provided inside the cut portion L20D (on the optical axis A side). With this, the second lens L20 can be more firmly fixed to the lens barrel 40. Further, when the end portion of the second lens engagement portion 44 on the optical axis A side is outside the cut portion L20D, the adhesive before solidification flows out, to the image side, from the air gap between the cut portion L20D and the inner surface of the lens barrel 40, therefore the third lens L3 and the like may be adversely affected, and it becomes difficult to realize the form of the first adhesive layer 50 as shown in FIG. 11.

Since such a method of molding the second lens can be similarly applied to the second lens L2 in the lens unit 1, the cut portion and the deformed portion in the second lens are used likewise for the second lens L2 in the lens unit 1. In this case, the same applies to the relation between the second lens engagement portion and the cut portion as described above.

In the above example, the outer peripheral grooves 10D and 40D are formed over the entire area in the circumferential direction. However, it is not necessary for the outer peripheral groove to be formed over the entire circumferential direction. Since the lens barrel is also formed by molding using a mold like the second lens described above, for example, this form can be appropriately set so that this molding is easy. Further, as long as the first lens and the second lens are fixed to the lens barrel, the number and configuration of lenses on the image side of the second lens can be appropriately set. At this time, among these lenses, setting of those in which the outer peripheral portion and the lens barrel are in direct contact (the one in which the radial positional relation with respect to the lens barrel is directly fixed) and those in which the outer peripheral portion and the lens barrel are not in direct contact (the one in which the radial positional relation with respect to the lens barrel is indirectly fixed) is appropriately set according to the configuration. Corresponding to this, the engaging structure and the like for determining the radial positional relation between adjacent lenses are appropriately set.

Further, in the above example, after the airtightness test of (i) of FIG. 9, the second adhesive layer 31 is formed in a state where the inside of the lens barrel 10 is at an atmospheric pressure. At this time, dry nitrogen or the like may be introduced into the space between the first lens L1 and the second lens L2.

In addition, in FIGS. 1 and 11, the first adhesive layer (second seal member) may be brought into contact with the first lens first lower surface L1A to thereby seal this portion. Even in this case, between the first lens L1 and the second lens L2 is sealed, and the first lens L1 can be easily mounted ((f) of FIG. 7). In this case, the members constituting the space between the first lens L1 and the second lens L2 are only the first lens L1, the second lens L2, and the first adhesive layer, and the lens barrel does not constitute the space. Therefore, even when a lens barrel made of a highly hygroscopic material is used, it is difficult for moisture to enter the space between the first lens L1 and the second lens L2. Therefore, it is possible to further suppress the dew condensation from being generated on and fogging the surface of the first lens L1 on the image side and the surface of the second lens L2 on the object side. Even in this case, the test of the airtightness by the O-ring 20 as shown in (i) of FIG. 9 can be similarly performed via the communication passage 10E. At this time, this sealing may be performed by arranging another member on the first adhesive layer of FIGS. 1 and 11, instead of the first adhesive layer (second seal member) itself.

MAIN EFFECTS OF PRESENT EMBODIMENT

The features of the present embodiment are briefly summarized as follows.

(1) This lens unit 1, comprises: a first lens L1 arranged on an object (Ob) side in an optical axis direction along an optical axis A; a plurality of lenses (L2 to L6) including a second lens L2 adjacent to the first lens L1 on an image (Im) side in the optical axis A direction; and a lens barrel 10 to accommodate therein the first lens L1 and the plurality of the lenses (L2 to L6); wherein the lens unit 1 further comprises: an O-ring (first seal member) 20 to seal between the first lens L1 and the lens barrel 10, and a first adhesive layer (second seal member) 30 to seal between the second lens L2 and the lens barrel 10, and wherein a communication passage 10E to communicate between a space between the first lens L1 and the second lens L2 in the lens barrel 10 and an outside of the lens barrel 10 is formed in the lens barrel 10, and a second adhesive layer (third seal member) 31 to close the communication passage 10E is provided in the communication passage 10E.

In this configuration, the space between the first lens L1 and the second lens L2 can be separated from the space, inside the lens barrel 10, of and after the second lens L2 by the second seal member 30, so that the moisture of the air in the space, inside the lens barrel 10, of and after the second lens L2, or of the air in the space inside the camera module that holds the lens barrel 10 can be prevented from flowing into the space side between the first lens L1 and the second lens L2. Therefore, it is possible to prevent any dew condensation from being generated on and fogging the surface of the first lens L1 on the image (Im) side and the surface of the second lens L2 on the object (Ob) side. On the other hand, when this space is sealed by the first seal member 20 and the second seal member 30, the air in the space between the first lens L1 and the second lens L2 cannot be exhausted and the assembling may be difficult. However, the lens unit 1 can be easily manufactured by sealing the communication passage 10E with the third seal member 31 after flowing the air through the communication passage 10E.

(2) On an outside of the second lens L2 in a radial direction around the optical axis A, the lens barrel 10 is formed with an outer peripheral groove 10D which is a groove in a form of being dug down from the image (Im) side toward the object (Ob) side, and the communication passage 10E communicates with the outer peripheral groove 10D.

In this configuration, the communication passage 10E communicates with the outer peripheral groove 10D, which makes it particularly easy to allow the air to flow through the communication passage 10E, and makes it particularly easy to manufacture the lens unit 1 and seal the space.

(3) A communication passage opening (opening portion) 10EA, of the communication passage 10E, on an inside of the lens barrel 10 has such a structure that an opening area when viewed from the inside in the radial direction is formed to be larger than the opening area when viewed from the optical axis A direction.

The adhesive to be the second adhesive layer 31 is applied along the depth direction (direction parallel to the optical axis A) of the outer peripheral groove 10D. In this configuration, since the opening area of the communication passage 10E is made small along the flow of the adhesive, leakage of the adhesive into the lens barrel at this time is suppressed.

(4) The second lens L2 is engaged on the object (Ob) side by a second lens engagement portion 14 which is a portion, of the lens barrel 10, that is bent toward a side intersecting the optical axis A, and the second seal member 30 is made of an adhesive that joins the second lens engagement portion 14 with the second lens L2.

In this configuration, the second lens L2 is fixed to the lens barrel 10 by the second lens engagement portion 14, and the second lens L2 is more firmly fixed to the lens barrel 10 by the adhesive that becomes the first adhesive layer 30.

(5) On the object (Ob) side, the second lens L2 includes a lens surface L2R1 through which a light ray to form an image passes, and a flange surface L2A located radially outside around the optical axis A, and the flange surface L2A is located on the image (Im) side of the lens surface L2R1, and the second lens engagement portion 14 is in contact with the flange surface L2A.

In this configuration, on the object (Ob) side, the second lens L2 includes the lens surface L2R1 that optically functions and a second lens upper surface (flange surface) L2A. Of these, by bringing the second lens upper surface L2A into contact with the second lens engagement portion 14, the second lens L2 can be firmly fixed to the lens barrel 10 while maintaining the optical characteristics of the second lens L2.

(6) A communication passage opening (opening portion) 10EA, of the communication passage 10E, on an inside of the lens barrel 10 is formed on the image (Im) side of the second lens engagement portion 14.

In this configuration, since the communication passage opening 10EA is located on the image (Im) side of the second lens engagement portion 14, even if the adhesive to be the second adhesive layer 31 leaks from the communication passage opening 10EA to the inside of the lens barrel 10, the adhesive flowing to the lens surface L2R1 side of the second lens L2 is blocked by the second lens engagement portion 14. That is, an adverse effect of leakage of the adhesive that becomes the second adhesive layer 31 is suppressed.

(7) The lens barrel 10 includes a first mounting portion 11 on and to which the first lens L1 is mounted from the object (Ob) side and fixed, and
  in the first mounting portion 11, a plurality of first mounting portion convex portions 11A protruding toward the object (Ob) side so as to come into contact with the first lens L1 is formed in a manner to be divided in a circumferential direction around the optical axis A, and when viewed from the object (Ob) side, the communication passage 10E is formed in the lens barrel 10 so as not to overlap with the first mounting portion convex portions 11A.

In this configuration, the positional relation of the first lens L1 with respect to the lens barrel 10 in the optical axis A direction is determined by the first mounting portion convex portions 11A. On the other hand, by not overlapping the communication passage 10E with the first mounting portion convex portions 11A, the positional accuracy of the first lens L1 with respect to the lens barrel 10 can be improved.

(8) The second lens engagement portion 44 is located on the image (Im) side of the lens surface L2R1, and the first adhesive layer 50 embeds the second lens engagement portion 44 and is made of the adhesive, and a communication passage opening (opening portion) 40EA as an opening, of the communication passage 40E, on an inside of the lens barrel 40 is formed on the object (Ob) side of the first adhesive layer 50.

In this configuration, by providing the second lens engagement portion 44 on the image (Im) side, the first adhesive layer 50 can have a shape including the second lens engagement portion 44 and embedding the periphery thereof. With this, between the second lens L20 and the lens barrel 10 can be more firmly fixed and sealed.

(9) The lens barrel 40 includes a first mounting portion 41 on and to which the first lens L1 is mounted from the object (Ob) side and fixed, and in the first mounting portion 41, a plurality of first mounting portion convex portions 41A protruding toward the object (Ob) side so as to come into contact with the first lens L1 is formed in a manner to be divided in a circumferential direction around the optical axis A, and when viewed from the object (Ob) side, the communication passage 40E is formed in the lens barrel 40 so as to overlap with the first mounting portion convex portions.

In this configuration, the positional relation of the first lens L1 with respect to the lens barrel 40 in the optical axis A direction is determined by the first mounting portion convex portions 41A. On the other hand, by overlapping the communication passage 40E with the first mounting portion convex portions 41A, the distance between the communication passage 40E and the first mounting portion 41 on the object (Ob) side thereof is increased, and even when the communication passage 40E is provided, the strength of this portion in the lens barrel 40 can be maintained, and the first adhesive layer 50 can be formed thick without lowering this strength.

(10) A cut portion L20D having a distance from the optical axis A locally reduced in the circumferential direction is formed on an outer periphery of the second lens L20 around the optical axis A, and a deformed portion L20E composed of a local unevenness is formed on an opposite side, on the second lens upper surface (flange surface) L20A, of the cut portion L20D, with the optical axis A interposed.

In this configuration, the resin molding which uses the first mold 700 and the second mold 701 which are provided with the gate 700A that corresponds to the cut portion L20D, and the degassing portion 702 that corresponds to the deformed portion L20E can easily and precisely manufacture the second lens L20.

(11) in a region where the cut portion L20D is formed in the circumferential direction, an end portion inside in the radial direction of the second lens engagement portion 44 is located, in the radial direction, to the inside of the cut portion L20D.

In this configuration, the second lens L20 can be more firmly fixed to the lens barrel 40 by providing the tip end of the second lens engagement portion 44 on the optical axis A side of the cut portion L20D, and the adhesive to be the first adhesive layer 50 is suppressed from flowing to the image side of the second lens L20.

(12) The communication passage 10E has a shape in which a cross-sectional area perpendicular to a flow path of air flowing through the communication passage 10E becomes smaller toward an inside of the lens barrel 10.

In this case, it becomes particularly easy to seal, with an adhesive, the communication passage opening 10EA which is an opening, of the communication passage 10E, on the inside of the lens barrel 10.

(13) A step is provided on an inner surface (corresponding to the second adhesive layer inner peripheral surface 31B) of the communication passage 10E on the optical axis A side so that a cross-sectional area becomes smaller toward an inside of the lens barrel 10.

In this case, increasing the contact area between the adhesive and the inner surface of the communication passage 10E by this step makes it possible to reliably seal the communication passage opening 10EA in particular.

(14) The lens barrel 10 includes a first lens outer periphery support portion to support a first lens first outer peripheral surface L1C as an outer peripheral surface of the first lens around the optical axis on the object (Ob) side of the first mounting portion, and the O-ring (first seal member) 20 is provided between the first lens L1 and the first lens outer periphery support portion 15 and made of an elastic material.

In this case, the O-ring 20, which is the first seal member, can particularly reliably seal between the first lens L1 and the lens barrel 10. At this time, using the first adhesive layer 30, the communication passage 10E, and the second adhesive layer 31 can particularly easily manufacture the lens unit 1.

At least the embodiment of the present invention has been described based on the embodiment and the modified example thereof, but it will be understood by those skilled in the art that this embodiment is an example, and various modified examples are possible for the combination of each component thereof, and such a modified example is also within the scope of at least the embodiment of the present invention.

What is claimed is:
1. A lens unit, comprising:
   a first lens, arranged on an object side in an optical axis direction along an optical axis;
   a plurality of lenses, including a second lens adjacent to the first lens on an image side in the optical axis direction;
   a lens barrel, comprising:
      a first accommodating portion to accommodate the first lens;
      a second accommodating portion to accommodate the plurality of the lenses; and
      an outer peripheral groove, provided on an outside of the second accommodating portion when viewed from the optical axis, and the outer peripheral groove is provided in an annular shape around the optical axis;
   a first seal member to seal between the first lens and the first accommodating portion of the lens barrel;
   a second seal member, comprising an adhesive, to seal between the second lens and the second accommodating portion of the lens barrel so that the moisture of the air in a space inside the second accommodating portion of the lens barrel is prevented from flowing into a first space that is located between the first lens and the second lens,
   wherein a communication passage is provided in the lens barrel and is disposed on the object side of the outer peripheral groove, and
   the communication passage connects the first space and a second space located at an opening of the lens barrel to the outer peripheral groove, so that the air in the first space moves out of the lens barrel via the communication passage and the outer peripheral groove; and
   a third seal member to close the communication passage is provided in the communication passage.
2. The lens unit according to claim 1, wherein
   on an outside of the second lens in a radial direction around the optical axis, the lens barrel is provided with the outer peripheral groove which is a groove along a direction of the optical axis, and
   the communication passage communicates with the outer peripheral groove.
3. The lens unit according to claim 2, wherein
   an opening portion of the communication passage, on an inside of the lens barrel, has such a structure that an opening area when viewed from an inside in the radial direction is provided to be larger than an opening area when viewed from the optical axis direction.
4. The lens unit according to claim 1, wherein
   the second lens is engaged on the object side by a second lens engagement portion which is a portion, of the lens barrel, that is bent toward a side intersecting the optical axis, and the second seal member is made of the adhesive that joins the second lens engagement portion with the second lens.

5. The lens unit according to claim 4, wherein
on the object side, the second lens includes the lens surface through which a light ray to form an image passes, and a flange surface located radially outside around the optical axis, and
the flange surface is located on the image side of the lens surface, and the second lens engagement portion is in contact with the flange surface.

6. The lens unit according to claim 5, wherein
an opening portion of the communication passage, on an inside of the lens barrel is provided on the image side of the second lens engagement portion.

7. The lens unit according to claim 6, wherein
the lens barrel includes a first mounting portion on and to which the first lens is mounted from the object side and fixed, and
the first mounting portion comprises a plurality of convex portions in contact with the first lens in a circumferential direction around the optical axis, and
the communication passage of the lens barrel has a non-overlapping portion of space with the convex portions.

8. The lens unit according to claim 5, wherein
the second lens engagement portion is located on the object side of the lens surface of the second lens, and
the second seal member seals the second lens to the second lens engagement portion and is made of the adhesive, and
an opening portion of the communication passage, on an inside of the lens barrel is provided on the object side of the second seal member.

9. The lens unit according to claim 8, wherein
the lens barrel includes a first mounting portion on and to which the first lens is mounted from the object side and fixed, and
the first mounting portion comprises a plurality of convex portions in contact with the first lens in a circumferential direction around the optical axis, and
the communication passage of the lens barrel has a non-overlapping portion of space with the convex portions.

10. The lens unit according to claim 5, wherein
a cut portion in the circumferential direction is provided on an outer periphery of the second lens around the optical axis, and
a deformed portion of the cut portion is composed of a local unevenness.

11. The lens unit according to claim 10, wherein
the cut portion is adjacent to an end portion of the second lens engagement portion.

12. The lens unit according to claim 1, wherein
the communication passage progressively becomes smaller from the opening of the lens barrel toward an inside of the lens barrel.

13. The lens unit according to claim 10, wherein
a step is provided on an inner surface of the communication passage on the optical axis side so that a cross-sectional area becomes smaller toward an inside of the lens barrel.

14. The lens unit according to claim 7, wherein
the lens barrel includes a first lens outer periphery support portion to support an outer peripheral surface of the first lens around the optical axis on the object side of the first mounting portion, and
the first seal member is an O-ring provided between the first lens and the first lens outer periphery support portion and made of an elastic material.

15. The lens unit according to claim 3, wherein
the second lens is engaged on the object side by a second lens engagement portion which is a portion, of the lens barrel, that is bent toward a side intersecting the optical axis, and
the second seal member is made of the adhesive that joins the second lens engagement portion and the second lens.

16. The lens unit according to claim 15, wherein
on the object side, the second lens includes the lens surface through which a light ray to form an image passes, and a flange surface located radially outside around the optical axis, and
the flange surface is located on the image side of the lens surface, and the second lens engagement portion is in contact with the flange surface.

17. The lens unit according to claim 7, wherein
on an outside of the second lens in a radial direction around the optical axis, the lens barrel is provided with the outer peripheral groove which is a groove along a direction of the optical axis, and
the communication passage communicates with the outer peripheral groove.

18. The lens unit according to claim 17, wherein
an opening portion of the communication passage, on an inside of the lens barrel, has such a structure that an opening area when viewed from an inside in the radial direction is provided to be larger than an opening area when viewed from the optical axis direction.

19. The lens unit according to claim 9, wherein
on an outside of the second lens in a radial direction around the optical axis, the lens barrel is provided with the outer peripheral groove which is a groove along a direction of the optical axis, and
the communication passage communicates with the outer peripheral groove.

20. The lens unit according to claim 19, wherein
an opening portion of the communication passage, on an inside of the lens barrel has such a structure that an opening area when viewed from an inside in the radial direction is provided to be larger than an opening area when viewed from the optical axis direction.

* * * * *